US011897522B2

(12) United States Patent
Melvelle et al.

(10) Patent No.: US 11,897,522 B2
(45) Date of Patent: Feb. 13, 2024

(54) RAILWAY TRACK TROLLEY

(71) Applicant: Melvelle Equipment Corp. Pty Ltd, New South Wales (AU)

(72) Inventors: Andrew Melvelle, New South Wales (AU); Ben de Rooy, New South Wales (AU); Gary Morris, New South Wales (AU); Jason Casboult, New South Wales (AU)

(73) Assignee: Melvelle Equipment Corp. Pty Ltd, New South Wales (AU)

( * ) Notice: Subject to any disclaimer, the term of this patent is extended or adjusted under 35 U.S.C. 154(b) by 777 days.

(21) Appl. No.: 16/768,821

(22) PCT Filed: Aug. 30, 2018

(86) PCT No.: PCT/AU2018/050935
§ 371 (c)(1),
(2) Date: Jun. 1, 2020

(87) PCT Pub. No.: WO2019/119021
PCT Pub. Date: Jun. 27, 2019

(65) Prior Publication Data
US 2021/0171070 A1 Jun. 10, 2021

(30) Foreign Application Priority Data
Dec. 22, 2017 (AU) ................................ 2017905148

(51) Int. Cl.
*B61F 7/00* (2006.01)
*B61D 15/12* (2006.01)
(Continued)

(52) U.S. Cl.
CPC ................ *B61F 7/00* (2013.01); *B61D 15/08* (2013.01); *B61D 15/12* (2013.01); *B61D 17/046* (2013.01); *E05B 65/0007* (2013.01)

(58) Field of Classification Search
CPC ........... B61F 7/00; B61D 15/08; B61D 15/12; B61D 17/046; E05B 65/0007; B66F 11/042; E05C 1/04; E06B 11/02
(Continued)

(56) References Cited

U.S. PATENT DOCUMENTS 73,295 A * 1/1868 Carter ....................... B61F 7/00 105/178
2,004,676 A 6/1935 Seitter
(Continued)

FOREIGN PATENT DOCUMENTS

AU 2016219593 B2 3/2017
CH 620400 A5 * 11/1980 ................ B61F 7/00
(Continued)

OTHER PUBLICATIONS

International Search Report issued by ISA/AU in connection with PCT/AU2018/050935 on Dec. 20, 2018.
(Continued)

*Primary Examiner* — Zachary L Kuhfuss
(74) *Attorney, Agent, or Firm* — Levenfeld Pearlstein, LLC

(57) ABSTRACT

The present invention relates broadly to a railway track trolley (10) generally comprising a collapsible chassis (12), two pairs of wheels (14*a/b*) and (16*a/b*), and a platform assembly (18). The collapsible chassis (12) includes a pair of opposing beams member (20*a*) and (20*b*) interconnected by a pair of adjustable cross-members (22) and (24). The pair of wheels (14*a*) and (16*a*) are removably mounted to opposing ends of one of the beam members (20*a*) whereas the other pair of wheels (14*b*) and (16*b*) are removably mounted to opposing ends of the other of the beam members (20*b*). The railway tracks (26*a*) and (26*b*) may be separated at one of a plurality of predetermined track gauges and the col-
(Continued)

lapsible chassis in an expanded condition is designed to match the required lateral separation of the opposing rail members (26_a/b_). The invention is also directed broadly to a gate catch assembly (90) generally comprising a coupling sub-assembly (92), and a catch sub-assembly (96) configured to be releasably engaged by the coupling sub-assembly (92). The gate catch assembly (90) may be installed in conjunction with the platform assembly (18) of the railway track trolley (10) of the earlier aspect of the invention.

8 Claims, 22 Drawing Sheets

(51) Int. Cl.

*B61D 17/04* (2006.01)
*E05B 65/00* (2006.01)
*B61D 15/08* (2006.01)

(58) Field of Classification Search

USPC .......................................................... 105/178
See application file for complete search history.

(56) References Cited

U.S. PATENT DOCUMENTS

| | | | | |
|---|---|---|---|---|
| 2,901,984 | A | 9/1959 | Dorey | |
| 3,424,106 | A * | 1/1969 | Webb | B61D 15/12 105/215.1 |
| 2007/0089640 | A1 | 4/2007 | Fortuna et al. | |
| 2016/0368510 | A1 | 12/2016 | Simon et al. | |

FOREIGN PATENT DOCUMENTS

| | | | | |
|---|---|---|---|---|
| CN | 112498404 | A * | 3/2021 | B61F 7/00 |
| KR | 20080100299 | A * | 11/2008 | B61D 15/08 |
| KR | 100955531 | B1 | 5/2010 | |
| KR | 101360958 | B1 | 2/2014 | |
| WO | 2019119021 | A1 | 6/2019 | |

OTHER PUBLICATIONS

Written Opinion issued by ISA/AU in connection with PCT/AU2018/050935 on Dec. 20, 2018.
International Preliminary Report on Patentability issued by ISA/AU in connection with PCT/AU2018/050935 on Jul. 3, 2019.

* cited by examiner

RAILWAY TRACK TROLLEY

This is a National Stage Application of international Patent Application No. PCT/AU2018/050935, filed 30 Aug. 2018, which claims the benefit of and priority to Australian (AU) Patent Application No. 2017905148, tiled 22 Dec. 2017, the entireties of which are incorporated fully herein by reference.

TECHNICAL FIELD

The present invention relates broadly to a railway track trolley and relates particularly, although not exclusively, to a railway track inspection trolley. The invention is also broadly directed to a gate catch assembly such as that suitable for use on a gate of a railway track trolley or other mobile railway maintenance equipment.

BACKGROUND OF INVENTION

Railway track inspection trolleys are typically used in connection with rail maintenance. The inspection trolley may be self-propelled with maintenance personnel riding upon the trolley in order to inspect the track for damage. Maintenance personnel are otherwise required to walk on track ballast or other uneven surfaces which inevitably results in injury. However, inspection trolleys are necessarily robust in construction making them heavy and cumbersome to move generally requiring appropriate lifting equipment. In the absence of appropriate lifting equipment, maintenance personnel may be required to manually lift the trolley exposing them to a high risk of injury.

SUMMARY OF INVENTION

According to a first aspect of the present invention there is provided a railway track trolley comprising:

a collapsible chassis including a pair of opposing beam members interconnected by a pair of adjustable cross members;

a pair of wheels mounted to each of the pair of opposing beam members whereby the collapsible chassis in an expanded condition is adapted to locate each of the pair of wheels on respective of a pair of railway tracks arranged at one of a plurality of predetermined track gauges, the pair of adjustable cross members being manipulated in length dependent on said one of the plurality of predetermined track gauges to achieve the required lateral separation of the opposing beam members in the expanded condition of the collapsible chassis.

Preferably the pair of adjustable cross members are each pivotally connected at opposing ends to respective of the pair of opposing beam members which are of a fixed length. More preferably the pair of cross members are of a telescopic construction arranged diagonal to one another with the collapsible trolley in the expanded condition. Still more preferably one of the telescopic cross members is at opposing ends pivotally connected proximal opposite ends of the respective beam members, the other of the diagonal cross members at opposing ends being pivotally connected proximal opposite ends of the respective beam members. Even more preferably the telescopic cross members permit movement of the collapsible chassis from a collapsed condition into the expanded condition with the telescopic cross members moving in a scissor action.

Preferably the trolley also comprises one of a plurality of platforms being selected depending on the required lateral separation of the opposing beam members in the expanded condition of the collapsible chassis, said selected platform being detachably mounted to the collapsible chassis wherein the trolley is of a demountable construction. More preferably each of the platforms includes a deck arranged to engage the collapsible chassis to retain it in the expanded condition. Still more preferably the deck is of a split construction. Even more preferably at least one of the pair of cross members supports the deck between the pair of opposing beam members when the collapsible chassis is in the expanded condition.

Preferably each of the pair of wheels are removably mounted to the respective pair of opposing beam members. More preferably one of each of the pair of wheels is driven for rotation via an associated drive mechanism. Even more preferably the inspection trolley is thus self-propelled.

Preferably said driven one of the pair of wheels is located proximal one end of the corresponding beam member, the other of the pair of wheels being a braked wheel located proximal an opposite end of said beam member. More preferably the driven wheels are disposed opposite one another and operatively coupled to either first or second driver stations dedicated to travel of the trolley in opposing directions. Even more preferably each of the driven wheels is associated with an activation switch configured to be operated by a driver located at the first or second driver station. Still more preferably each of the activation switches is associated with a control module dedicated to each of the driven wheels wherein actuation of said module is required for the respective activation switch to be operative.

Preferably the railway track trolley is an inspection trolley. Alternatively the railway track trolley is an emergency response vehicle or an equipment trolley.

According to a second aspect of the invention there is provided a gate catch assembly comprising: a coupling sub-assembly adapted to mount to a gate member, said coupling sub-assembly including:

i) an outer sleeve slidably mounted to the gate member for axial movement relative to the gate member between a retracted position and an extended position, ii) a locking element rotationally mounted to the outer sleeve for rotational movement relative to said sleeve between a locked position and an unlocked position, said locking element including a locking disk having a locking aperture configured to cooperate with a locking bolt associated with the gate member, the locking aperture adapter to:

a) permit passage of the locking bolt during axial movement of the outer sleeve toward the retracted position with the locking element rotated into the unlocked position;

b) misalign with the locking bolt to prevent its passage on axial movement of the outer sleeve from the extended position with the locking element rotated into the locked position a catch sub-assembly configured to be releasably engaged by the coupling sub-assembly, said catch sub-assembly including an engagement arrangement designed to be engaged by the outer sleeve of the coupling sub-assembly in its extended position whereupon movement of the locking element into the locked position limits axial movement of the outer sleeve from the extended position.

Preferably the locking bolt is mounted eccentric of an axis of the gate member, the locking aperture being substantially aligned with the eccentrically mounted locking bolt with the locking element in the unlocked position. More preferably the outer sleeve includes a circumferential keyway configured to be engaged by a corresponding key extending radially from the locking disc of the locking element. Still more preferably the key of the locking element permits rotational movement of the locking disc within the outer sleeve whilst limiting axial displacement of the locking disc relative to the outer sleeve.

Preferably the locking element includes retaining means arranged to cooperate with the catch sub-assembly to retain the locking element in the locked position with the outer sleeve of the coupling sub-assembly in its extended position. More preferably the retaining means includes a retaining magnet configured to align with and thus retain a magnetic element associated with the catch sub-assembly with the locking element in the locked position. Even more preferably the catch sub-assembly includes a sensor arranged to cooperate with the locking element to detect its rotation into the unlocked position.

Preferably the catch sub-assembly is mounted to a catch member within which the engagement arrangement is mounted. More preferably the engagement arrangement includes a pair of engagement pins protruding radially outward from the catch member for releasable engagement with corresponding apertures in the outer sleeve of the coupling sub-assembly when said outer sleeve is in the extended position. Even more preferably the engagement arrangement includes biasing means associated with the engagement pins to urge them radially outward of the catch member. Still more preferably the engagement arrangement also includes actuator means arranged to cooperate with the engagement pins to displace them radially inward of the catch member and out of engagement with the corresponding apertures of the outer sleeve to permit axial movement of the outer sleeve of the coupling sub-assembly toward the retracted position.

BRIEF DESCRIPTION OF DRAWINGS

In order to achieve a better understanding of the nature of the present invention a preferred embodiment of a railway track trolley and gate catch assembly will now be described, by way of example only, with reference to the accompanying drawings in which.

DETAILED DESCRIPTION

Figure 1:
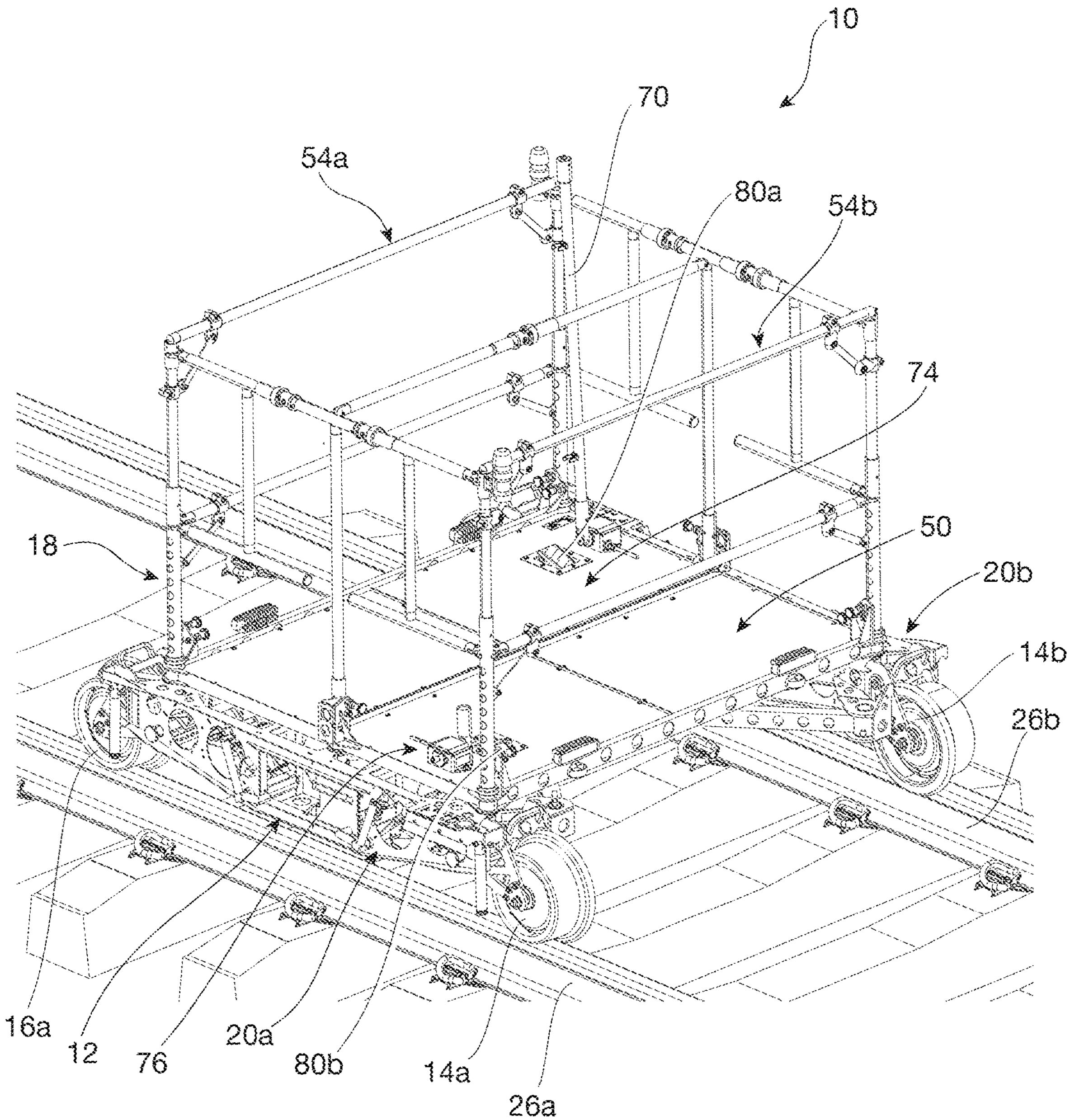
FIG. 1 is a perspective view of one embodiment of a railway track trolley according to a first aspect of the present invention located on a pair of laterally spaced rail members.
Figure 2:
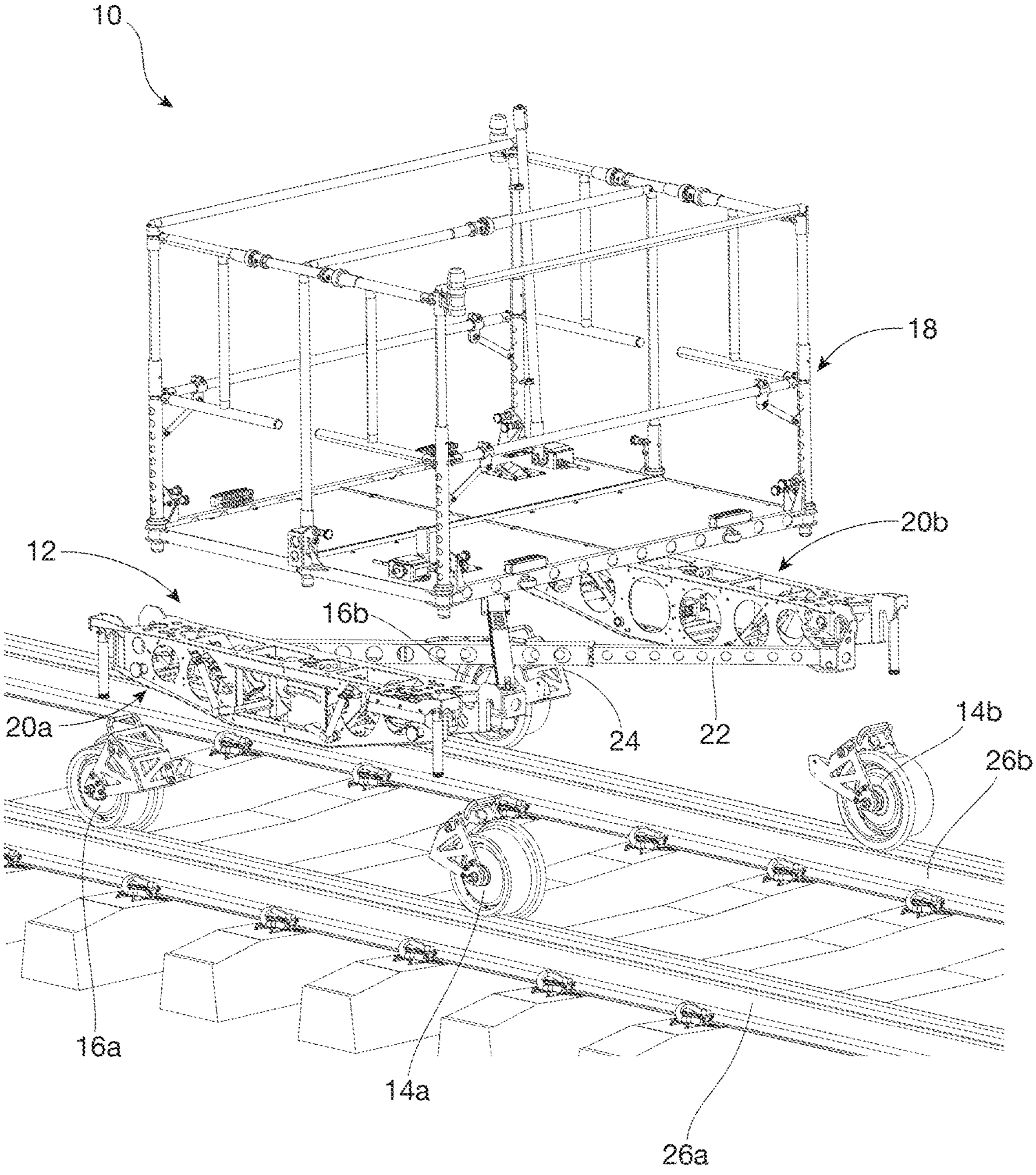
FIG. 2 is an exploded view shown in perspective of the railway track trolley of the embodiment of FIG. 1.

As best seen in FIGS. 1 and 2 there is a railway track trolley 10 according to one embodiment of a first aspect of the invention generally comprising a collapsible chassis 12, two pairs of wheels 14*a/b* and 16*a/b*, and a platform assembly 18. The collapsible chassis 12 includes a pair of opposing beam members 20*a* and 20*b* interconnected by a pair of adjustable cross members 22 and 24. The pair of wheels 14*a* and 16*a* are in this example removably mounted to opposing ends of one of the beam members 20*a* whereas the other pair of wheels 14*b* and 16*b* are removably mounted to opposing ends of the other of the beam members 20*b*.

As seen in FIGS. 1 and 2 the collapsible chassis 12 in an expanded condition is adapted to locate each of the pair of wheels 14*a*/16*a* and 14*b*/16*b* on respective of a pair of laterally spaced railway tracks 26*a* and 26*b*. The railway tracks 26*a* and 26*b* may be separated at one of a plurality of predetermined track gauges and the collapsible chassis 12 in the expanded condition is designed to match the required lateral separation of the opposing rail members 26*a/b*. The pair of adjustable cross members 22/24 are manipulated in length depending on the required track gauge or lateral separation of the rail members 26*a/b* for placement of the wheels 14*a*/16*a* and 14*b*/16*b* on the tracks 26*a/b*.

Figure 3A:
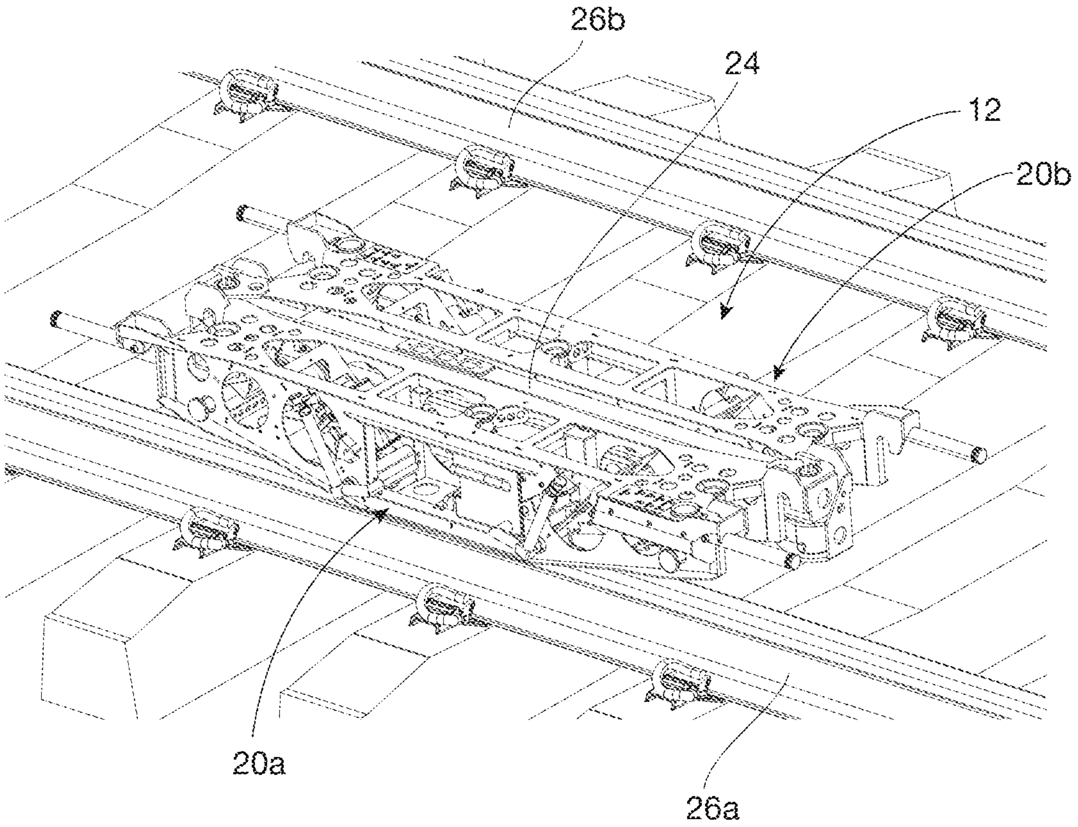
FIGS. 3A and 3B are perspective views of a collapsible chassis taken from the railway track trolley of the preceding embodiment in its collapsed and expanded conditions, respectively.
Figure 3B:
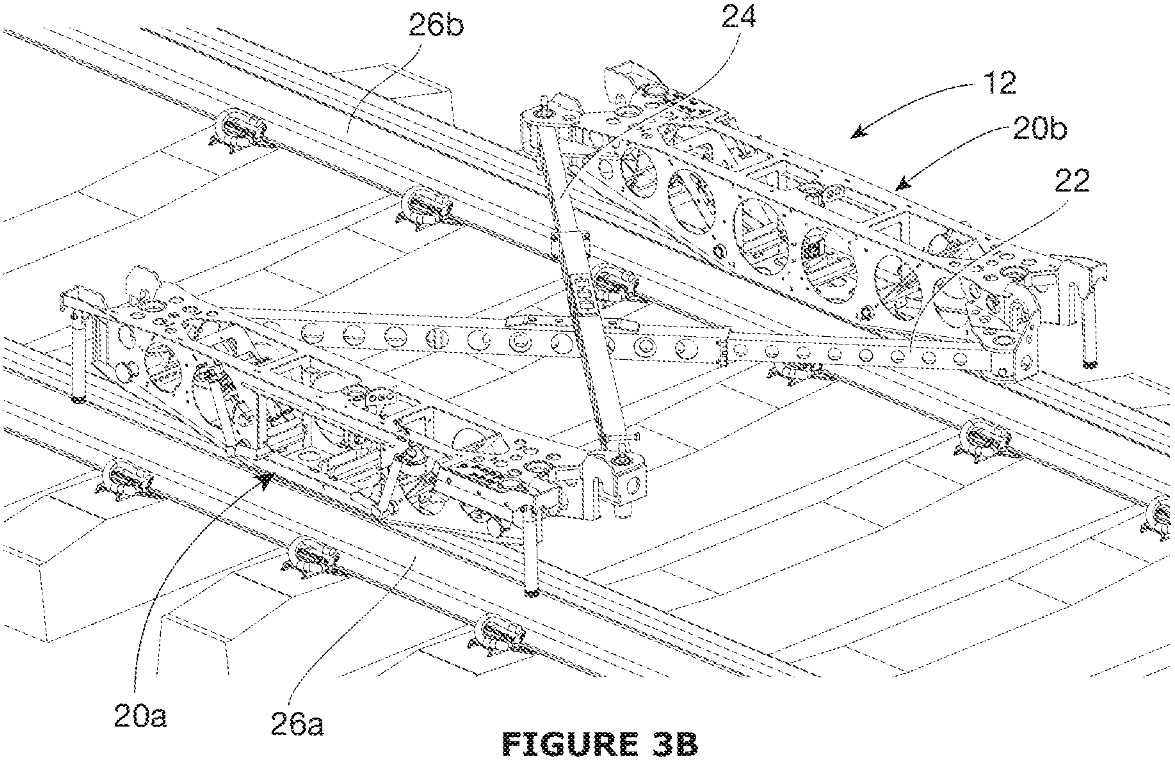

As best seen in FIGS. 3A and 3B the adjustable cross members 22 and 24 are of a telescopic construction permitting movement of the collapsible chassis 12 from a collapsed condition in FIG. 3A to the expanded condition in FIG. 3B. The pair of adjustable cross members 22/24 are each pivotally connected at opposing ends to respective of the pair of opposing beam members 20*a/b* which are of a fixed and equal length. The pair of telescopic cross members 22/24 are arranged diagonal to one another wherein one of the telescopic cross members 22 is at opposing ends pivotally connected proximal one end of one of the beam members 20*a* and an opposite end of the other the beam members 20*b*. The other of the diagonal and telescopic members 24 is at opposing ends pivotally connected proximal opposite ends of the respective beam members 20*a/b*. The collapsible chassis 12 is thus of a configuration where the telescopic cross members 22/24 move in a scissor action from the collapsed condition into the expanded condition and vice versa.

Figure 4A:
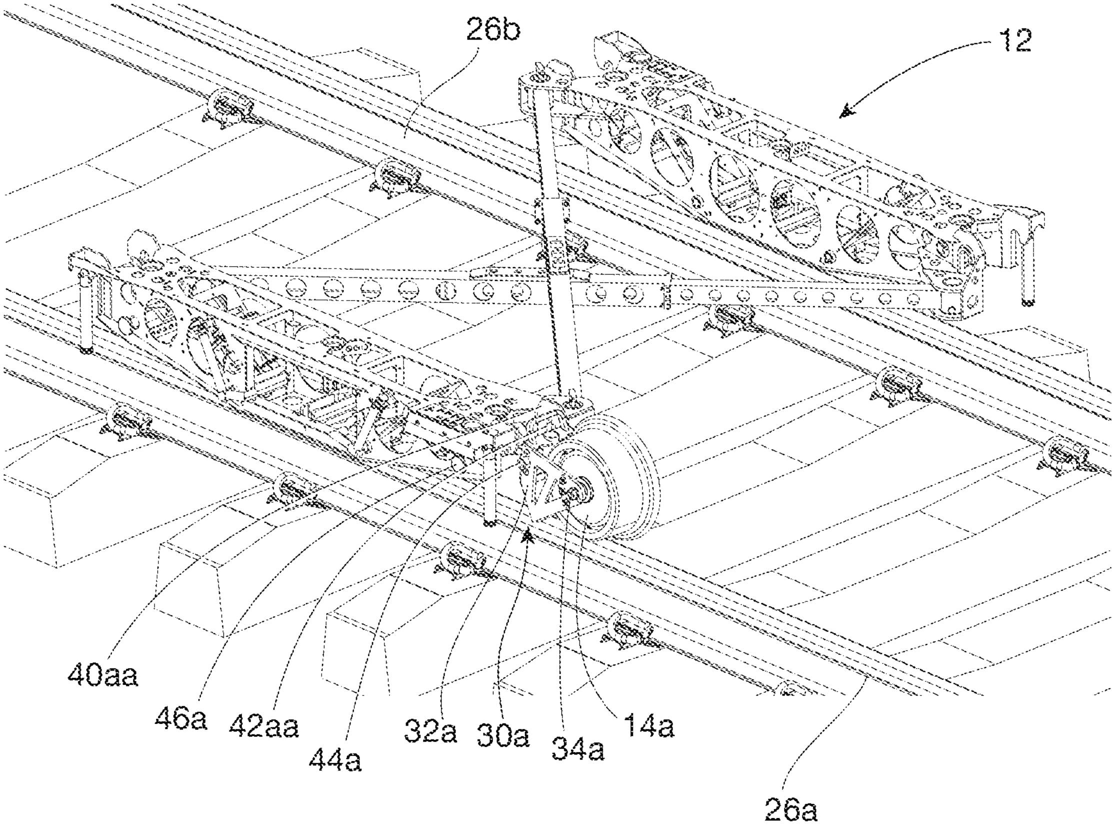
FIGS. 4A and 4B are enlarged perspective views of the collapsible chassis of the preceding figure in its expanded condition at the required lateral separation in the course of fitting one of the four wheels of the trolley.
Figure 4B:
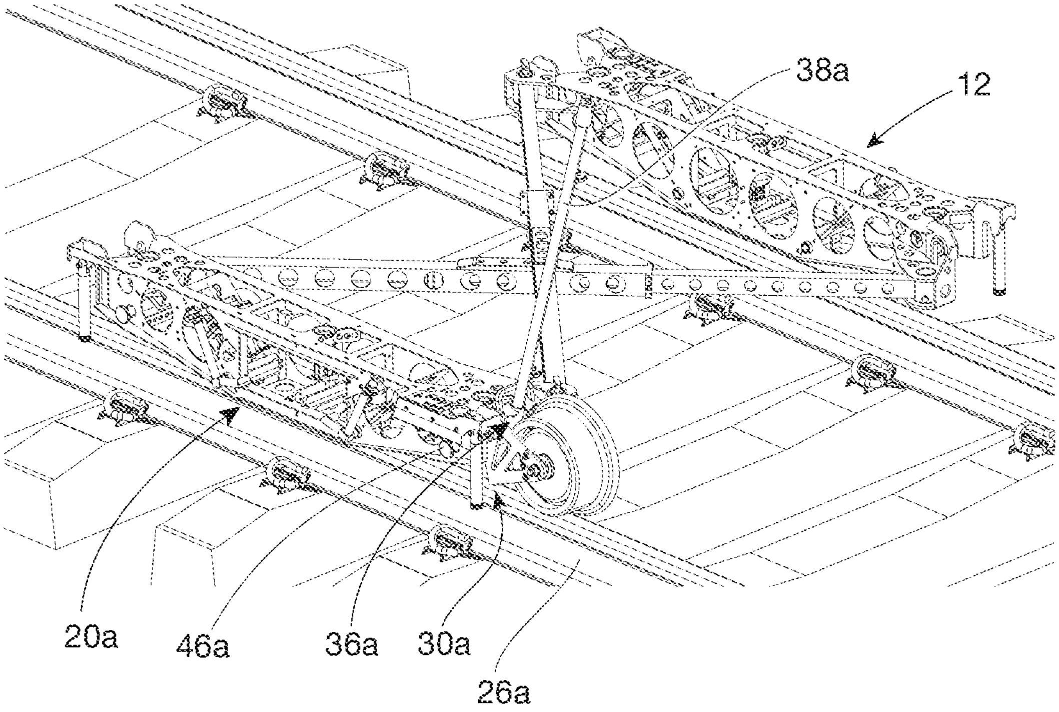

As best seen in FIGS. 4A and 4B the removable or demountable wheels such as 14*a* are rotatably mounted within a wheel support assembly 30*a*. The wheel support assembly 30*a* of this embodiment includes a wheel bracket 32*a* and a wheel axle 34*a* about which the wheel 14*a* rotates. The wheel bracket 32*a* includes a mounting spigot 36*a* designed to receive a handle 38*a* for pivoting of the wheel support assembly 30*a* into locking engagement with the beam member 20*a*. The beam member such as 20*a* at one of its ends includes a forked mounting 40*aa* designed to retractably receive the wheel support assembly 30*a*. In particular, the forked mounting 40*aa* includes a pair of opposing slots such as 42*aa* within which a pivot head 44*a* of the wheel support 30*a* is received. As seen in FIG. 4B the wheel support assembly 30*a* pivots about the pivot head 44*a* under the levering or rotation action of the handle 38*a*. The continued levering of the handle 38*a* lifts the collapsible chassis 12 clear of the railway tracks 26*a/b* until a retractable plunger such as 46*a* associated with the beam member 20*a* engages the wheel bracket 32*a*.

Figure 5:
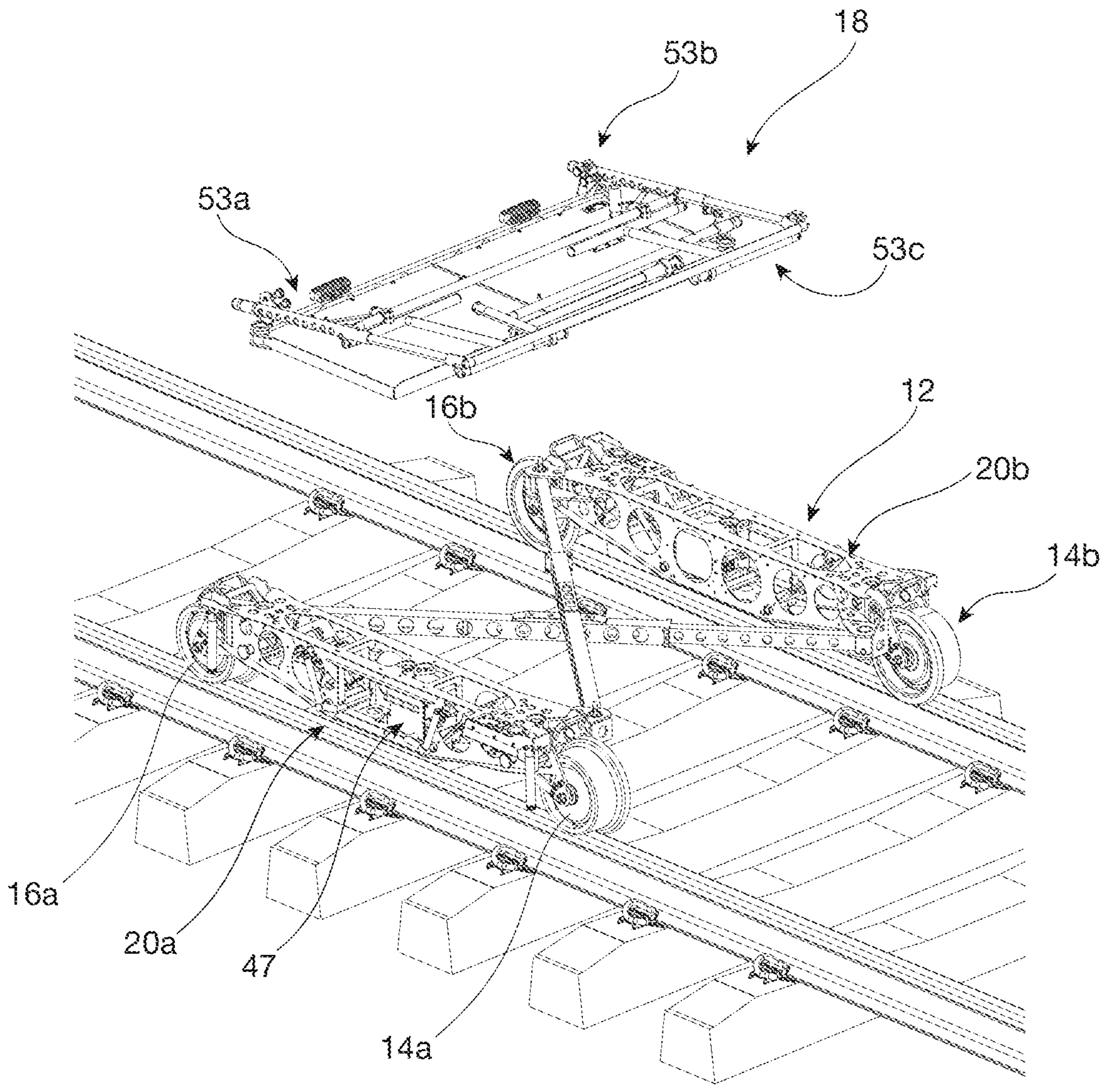
FIG. 5 is an exploded view in perspective of the collapsible trolley together with part of its associated platform.
Figure 6A:
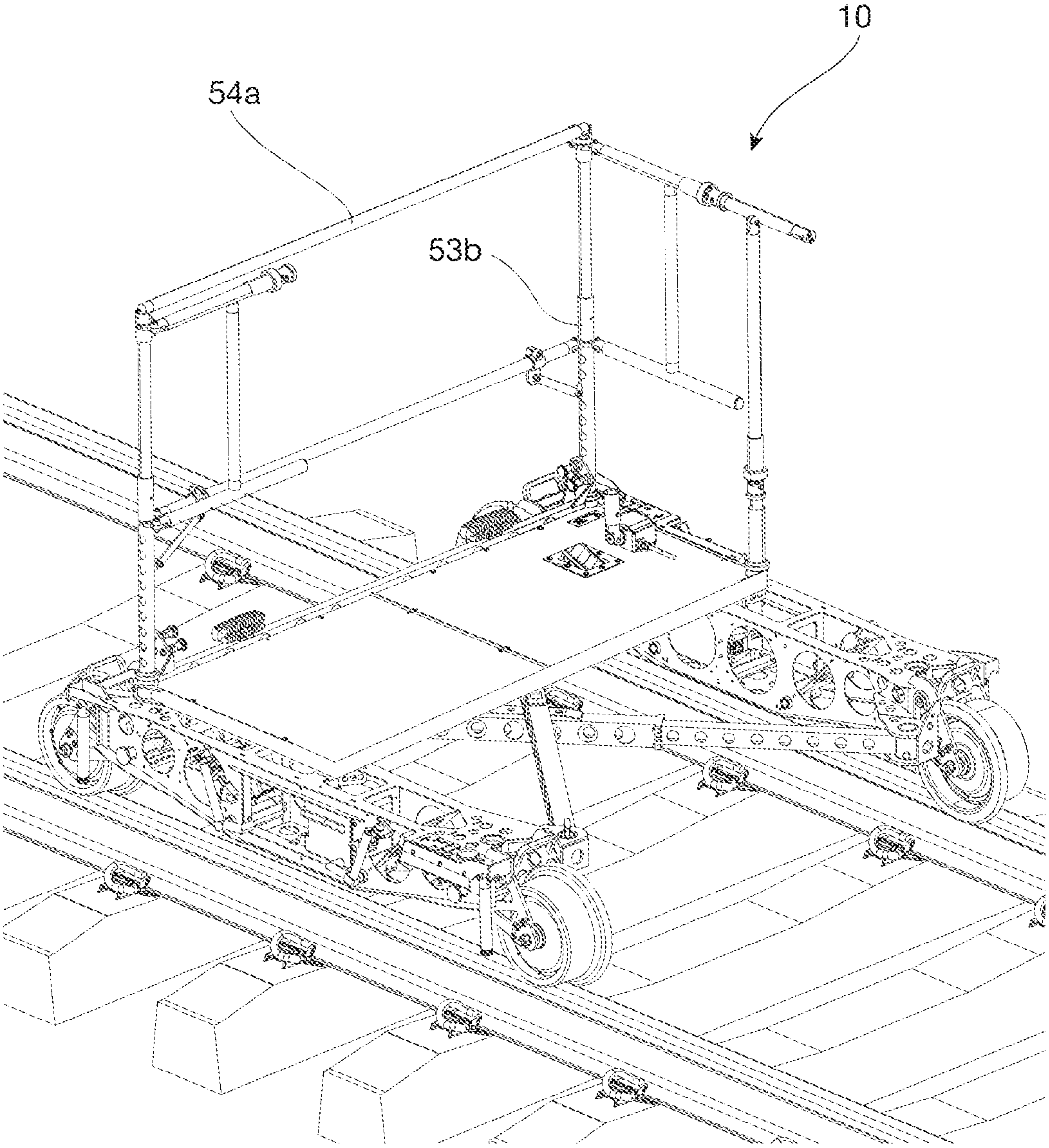
FIGS. 6A to 6D are perspective views of the collapsible trolley and its associated platform and handrails being assembled in consecutive stages from stowed to operative positions.
Figure 6B:
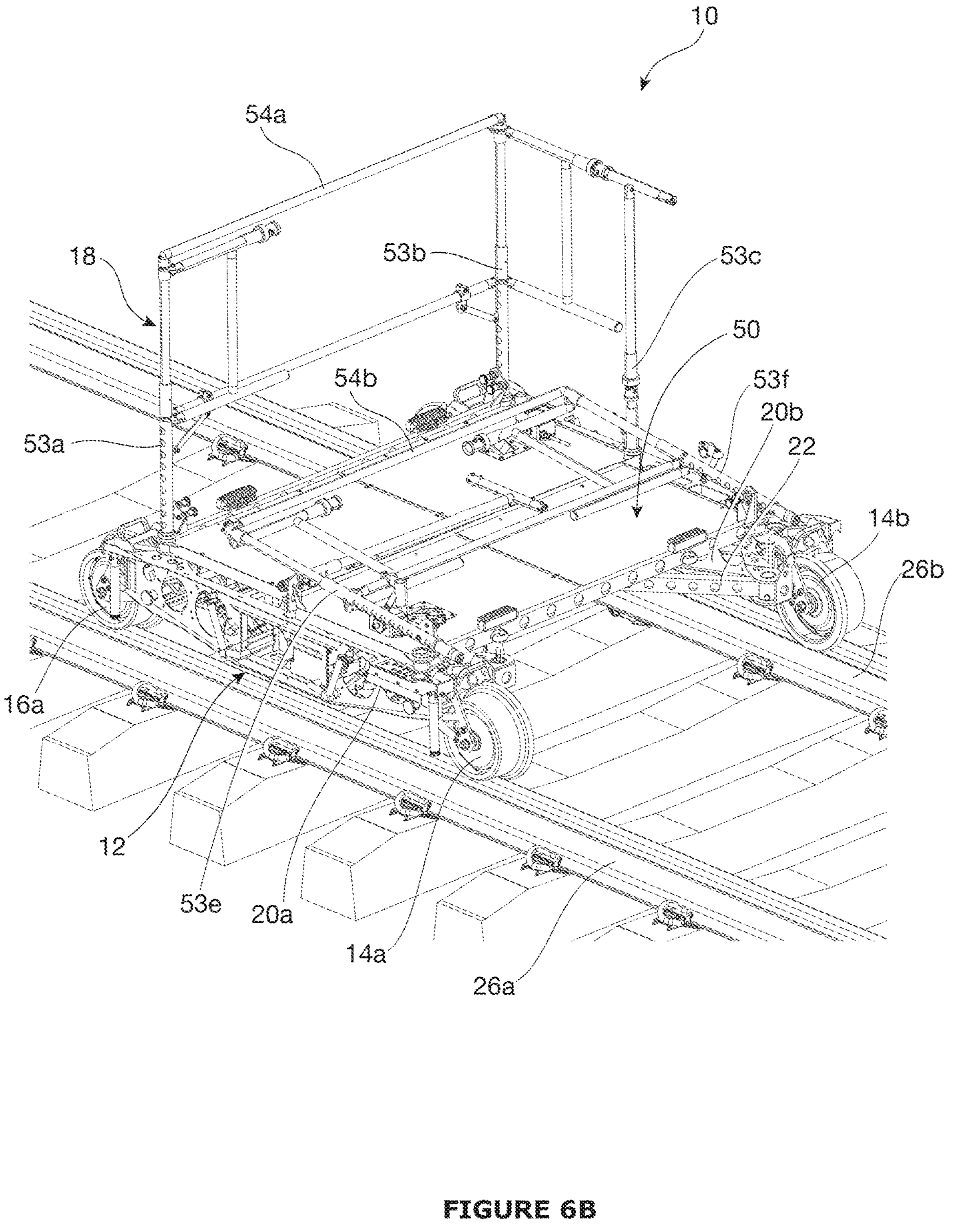
Figure 6C:
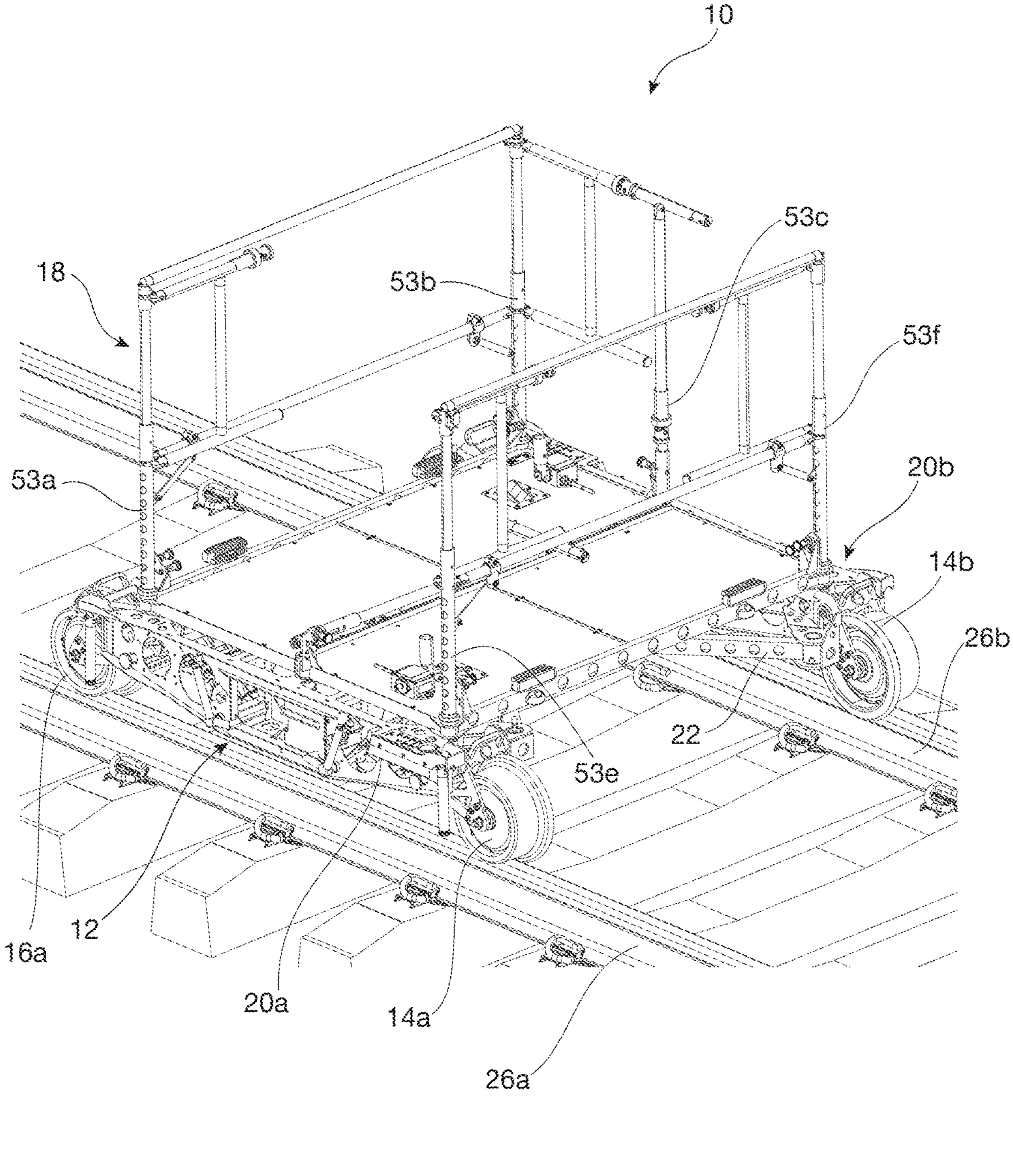
Figure 6D:
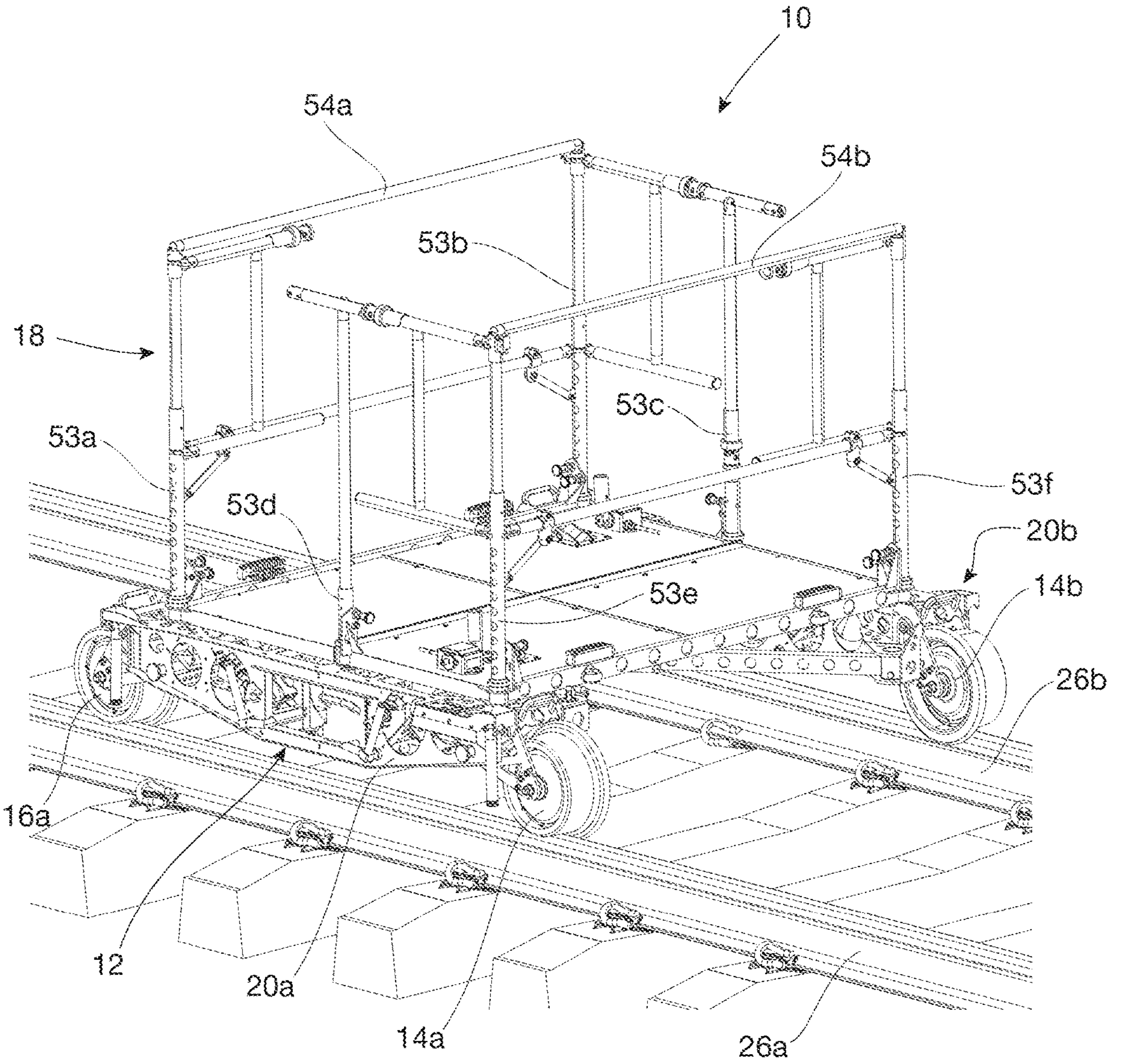

In this embodiment and as best seen in FIG. 5 the demountable wheels 14*a* and 14*b* are driven for rotation via a drive mechanism whereas the other pair of wheels 16*a* and 16*b* are braked wheels. The driven wheels 14*a/b* are powered via one or more batteries such as 47 mounted to the chassis 12. The trolley 10 includes a safety circuit (not depicted) which ensures that the trolley 10 is correctly assembled before power can be applied to the driven wheels 14*a/b*. In this example the two driven wheels 14*a/b* in conjunction with the two braked wheels 16*a/b* are operatively coupled to a control module (not shown) mounted to the chassis 12. The control module controls the required acceleration/deceleration and maximum speed limit together with braking and traction control by eliminating skidding.

As seen in FIG. 1 control of the trolley 10 is achieved through a control lever 70 retractably docked at a first driver station 74 in the deck 50 of the trolley 10. The control lever 70 is operatively coupled to the control module to provide proportional velocity control where pushing the lever 70 all the way forward brings the trolley 10 to maximum speed whilst setting the lever 70 halfway halves the speed providing accurate speed control regardless of the track inclination and payload. The control lever 70 is biased to return to "zero" whereby releasing the lever 70 will bring the trolley to rest at maximum deceleration. The first driver station 74 permits movement of the trolley 10 in one direction, and the trolley 10 is provided with a second driver station 76 diagonally opposite the first driver station 74 for movement of the trolley 10 in an opposite direction. The control lever 70 is docked at the second driver station 76 in the deck 50 to allow movement of the trolley 10 in the opposite direction.

In this embodiment the driven wheels 14*a* and 14*b* are associated with activation switches 80*a* and 80*b*. The activation switches 80*a/b* are in the form of "dead man" foot switches at each of the first and second driver stations 74/76 and require activation for the trolley 10 to operate. One only of the activation switches 80*a/b* is active at any one time and activation of the switch 80*a/b* is effected by docking of the control lever 70 at the first or second driver stations 74 or 76. This activation of the "dead man" switch 80*a* or 80*b* ensures that a passenger at the diagonally opposite driver station does not influence the driver controls of the trolley 10 by standing on or otherwise operating the "dead man" switch 80*a* or 80*b*. In order to advance the trolley 10 along the railway tracks 26*a/b* the activation switch 80*a* or 80*b* must be depressed at the first or second 74 or 76 driver station at which the control lever 70 is docked. The activation switches 80*a/b* also function as an emergency stop so that when they are de-activated power is cut from the driven wheels such as 14*a/b* and emergency/park brakes are applied to the braked wheels 16*a/b* bringing the trolley 10 to rest.

Figure 7:
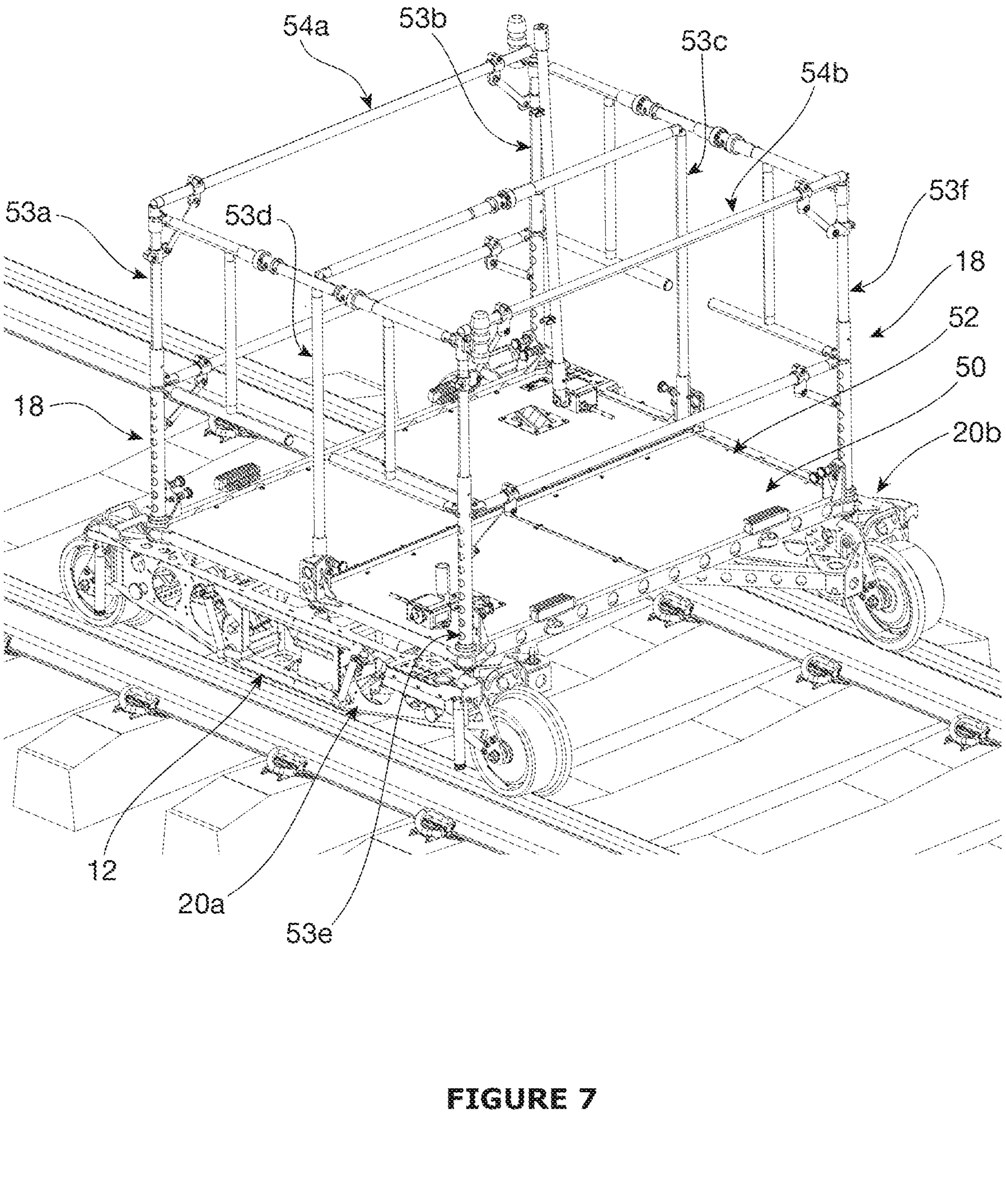
FIG. 7 is a perspective view of the collapsible trolley and its associated platform with the handrails disposed in the operative position.

As seen in FIGS. 5 and 7 the platform assembly 18 is lowered onto the collapsible chassis 12 in its expanded condition. The platform assembly 18 is of a split deck construction including two (2) decks such as 50 each having a perimeter frame such as 52. The platform assembly 18 also includes six (6) uprights or stanchions 53*a* to 53*f* retractably received within respective of three (3) perimeter corners of the two (2) perimeter frames such as 52. The platform assembly 18 further includes a plurality of handrails such as 54*a* and 54*b* mounted to the stanchions such as 53*a*. The perimeter frame such as 52 at each of its three (3) corners includes locking elements such as 56*aa* and 56*ab* for releasably engaging the respective stanchion such as 53*a*. The stanchions such as 53*a* also engage the opposing beam members 20*a/b* to retain the collapsible chassis 12 in the expanded condition. The platform assembly 18 is selected from one of a series of differently sized platform assemblies depending on the track gauge and thus required lateral separation of the beam members 20*a/b* in the expanded condition. The selected platform assembly 18 is thus detachably mounted to the collapsible chassis 12 wherein the railway track trolley 10 is of a demountable construction. The platform assembly 18 or deck 50 of this embodiment is supported by one of the telescopic cross members 24 between the pair of opposing beam members 20*a/b* when the collapsible chassis 12 is in the expanded condition.

FIGS. 6A to 6D illustrate typical steps involved in assembling the platform assembly 18 and erecting the associated handrails such as 54*a/b*. It will be appreciated that collapsing or dismantling of the platform assembly is performed by following this sequence of events in reverse. The configuration of handrails 54*a/b* and associated stanchions such as 53*a* will vary depending on the carrying or operator requirements of the trolley which in this example is designed to cater for up to four persons.

Figure 8:
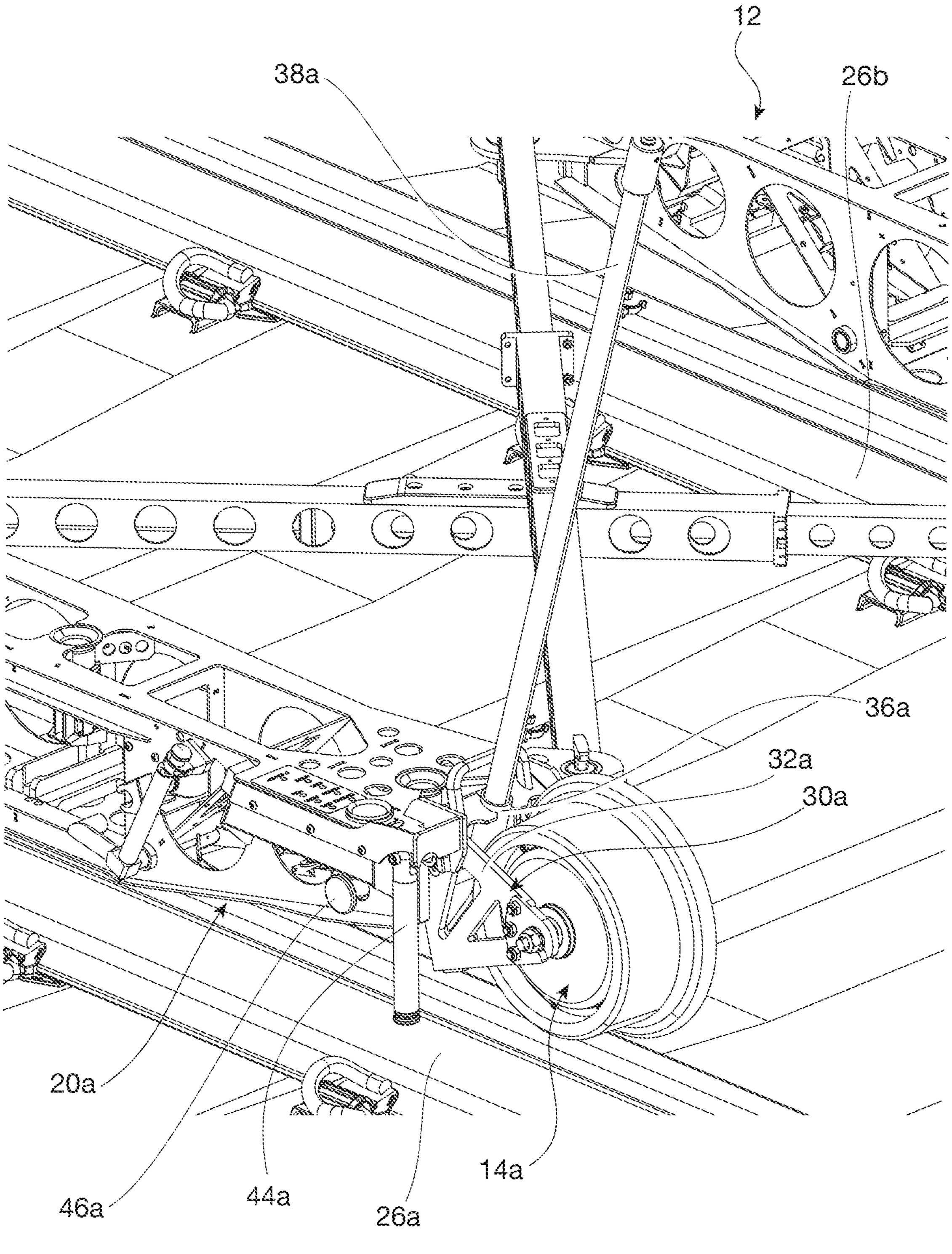
FIG. 8 is a detailed view in perspective taken from FIG. 4B showing the driven wheel fitted to the collapsible chassis.
Figure 9:
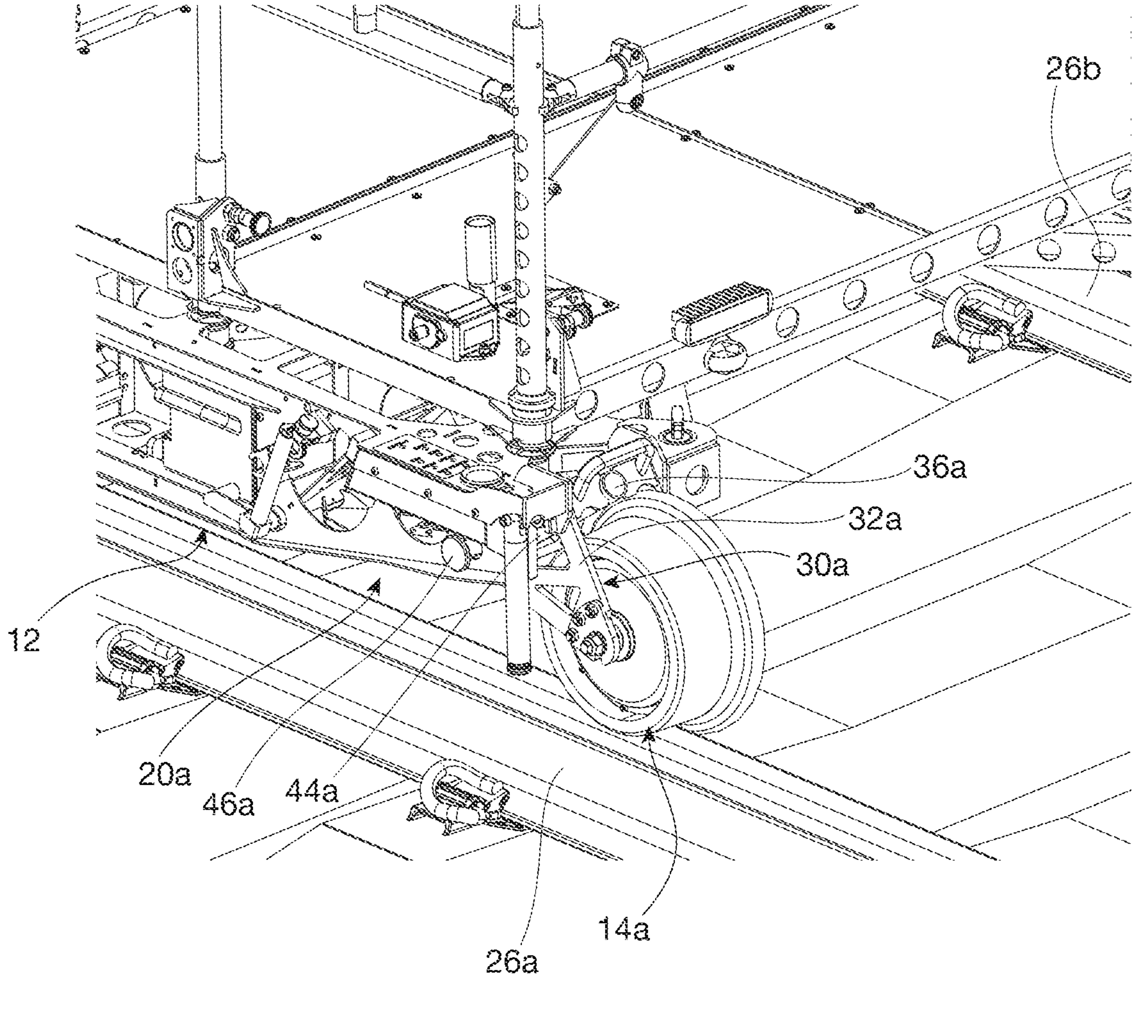
FIG. 9 is another detailed view of the driven wheel and collapsible chassis in the course of dismounting the driven wheel.

FIGS. 8 and 9 depict mounting and dismounting of the wheel 14*a* and its associated support assembly 30*a* from the beam member 20*a*. The retractable plunger 46*a* is biased into locking engagement with the wheel bracket 32*a*. The retractable plunger 46*a* is pulled out of engagement with the wheel bracket 32*a* as best seen in FIG. 9 to permit rotation of the wheel support assembly 30*a* about the pivot head 44*a* on lowering of the beam member 20*a* onto the railway track 26*a* in the course of dismounting or removing the wheel 14*a*. The handle 38*a* as seen in FIG. 8 is used to assist in this action.

Figure 10:
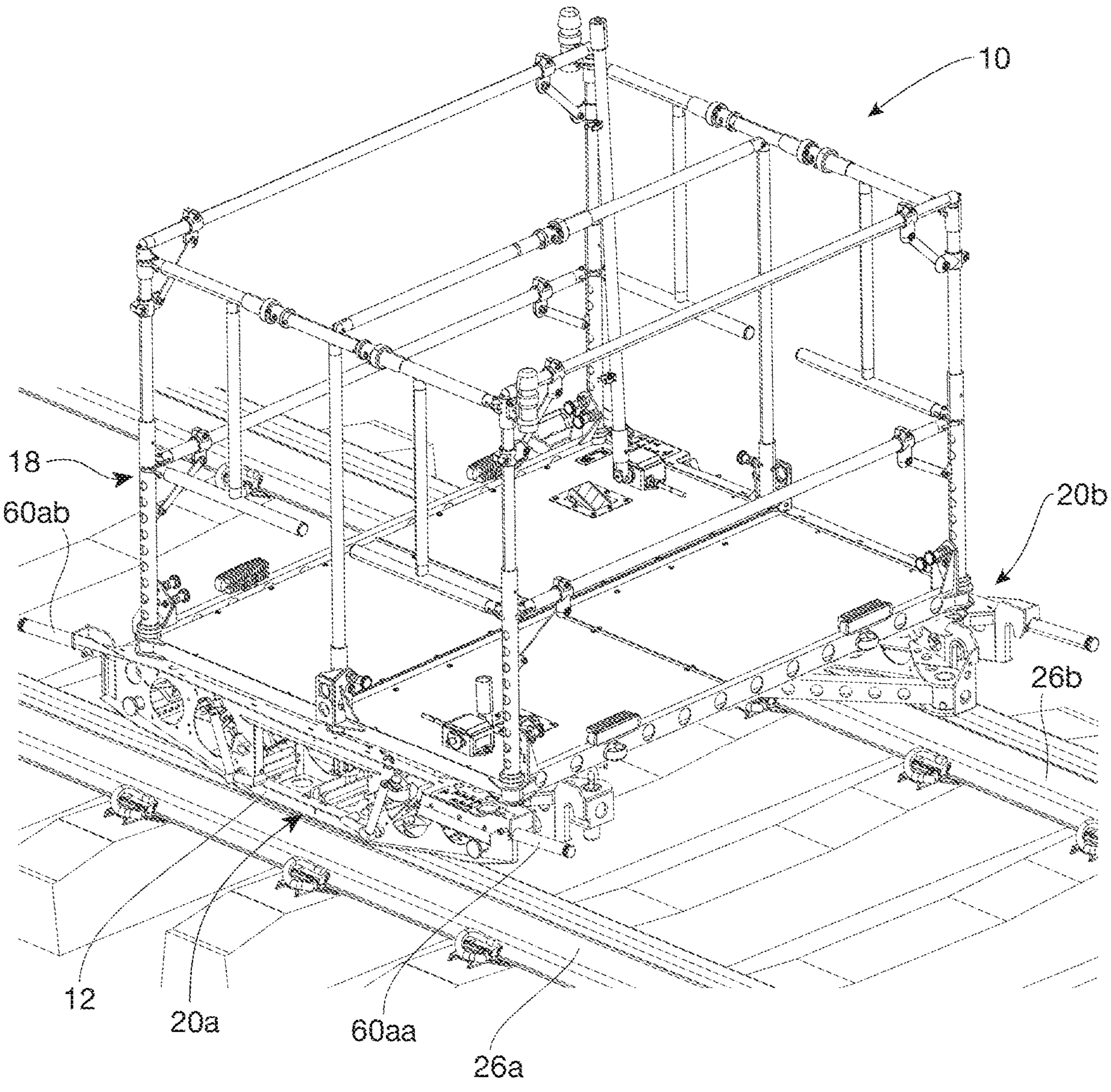
FIG. 10 is a perspective view of the railway track trolley of the preceding embodiment without its wheels in anticipation of lifting it from the rail members.
Figure 11:
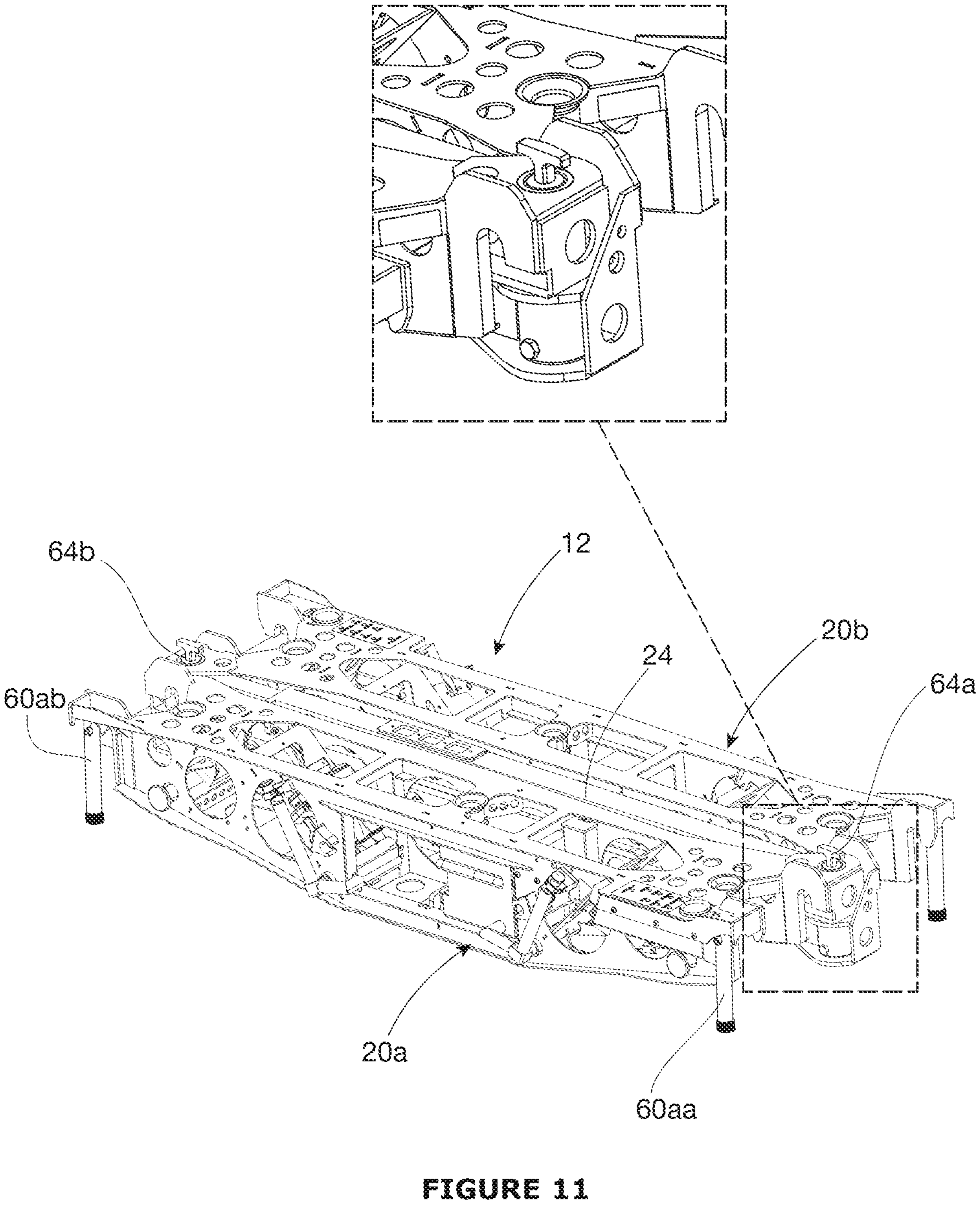
FIG. 11 is a perspective and detailed view of the collapsible chassis in its collapsed condition.

FIG. 10 shows the railway track trolley 10 with its wheels removed in anticipation of removing it from the railway tracks 26*a/b*. The beam members 20*a/b* each include a pair of lifting handles such as 60*aa* and 60*ab* at opposing ends of the beam member 20*a*. The handles 60*aa/ab* are pivoted from their vertical or inoperative position to a horizontal or lifting position in preparation for lifting of the chassis 12. In this configuration the expanded collapsible chassis 12 together with the platform assembly 18 may be lifted with a person dedicated to each of the handles such as 60*aa*, thereby requiring four persons to lift. Alternatively the platform assembly 18 may be removed from the collapsible chassis 12 for separate lifting. In this instance the collapsible chassis 12 is preferably moved into its collapsed condition as best seen in FIG. 11 prior to lifting. In this alternative mode of lifting it is possible to safely lift the trolley 10 with two persons only.

FIG. 11 shows the collapsible chassis 12 in its collapsed configuration. In this example the beam members 20*a/b* are designed to interlock in the collapsed condition. Opposing ends of the beam members 20*a/b* mate with one another in the collapsed condition and an interlock member such as 64*a* inter-engages the mating beam members 20*a/b* to retain the collapsible chassis in its collapsed condition. The collapsible chassis 12 can thus be safely lifted without the risk of inadvertently expanding in the course of lifting and/or transporting. It is expected that the heaviest component of the trolley 10 when disassembled will weigh no more than around 40 kg which typically means no more than two (2) persons are required to move the disassembled trolley 10.

As best seen in FIGS. 12 to 19 there is a gate catch assembly 90 according to an embodiment of a second aspect of the invention. The gate catch assembly 90 is intended to be installed in conjunction with the platform assembly 18 of the railway track trolley of the preceding aspect of the invention. However, the gate catch assembly is not limited to this application and extends to other applications where secure latching of a gate is required. In this embodiment the primary function of the gate catch assembly 90 is:

when unlatched or in its open condition, to allow the associated gate to swing inwards or outwards;

when latched or in its closed condition:

i) to prevent the gate swinging, ii) to create an axially "rigid" associated handrail, effectively tying neighbouring stanchions together, iii) to provide a signal to a safety controller that the gate is in a safe state.

The gate catch assembly 90 generally comprises a coupling sub-assembly 92 adapted to mount to a handrail in the form of a gate member 94 associated with a gate (not shown), and a catch sub-assembly 96 associated with another handrail mounted to a stanchion (not shown) and configured to be releasably engaged by the coupling sub-assembly 92. The gate catch assembly 90 is considered to be in its closed condition with the catch sub-assembly 96 engaged by the coupling sub-assembly 92 whereas release of the catch sub-assembly 96 from the coupling sub-assembly 92 renders the gate catch assembly 90 in its open condition.

In this embodiment the coupling sub-assembly 92 includes:

1. an outer sleeve 98 slidably mounted to the gate member 94 for axial movement relative to the gate member 94 between a retracted position and an extended position;
2. a locking element 100 operatively coupled to the outer sleeve 98 for movement relative to the outer sleeve 98 between a locked position and an unlocked position.

Figure 12A:
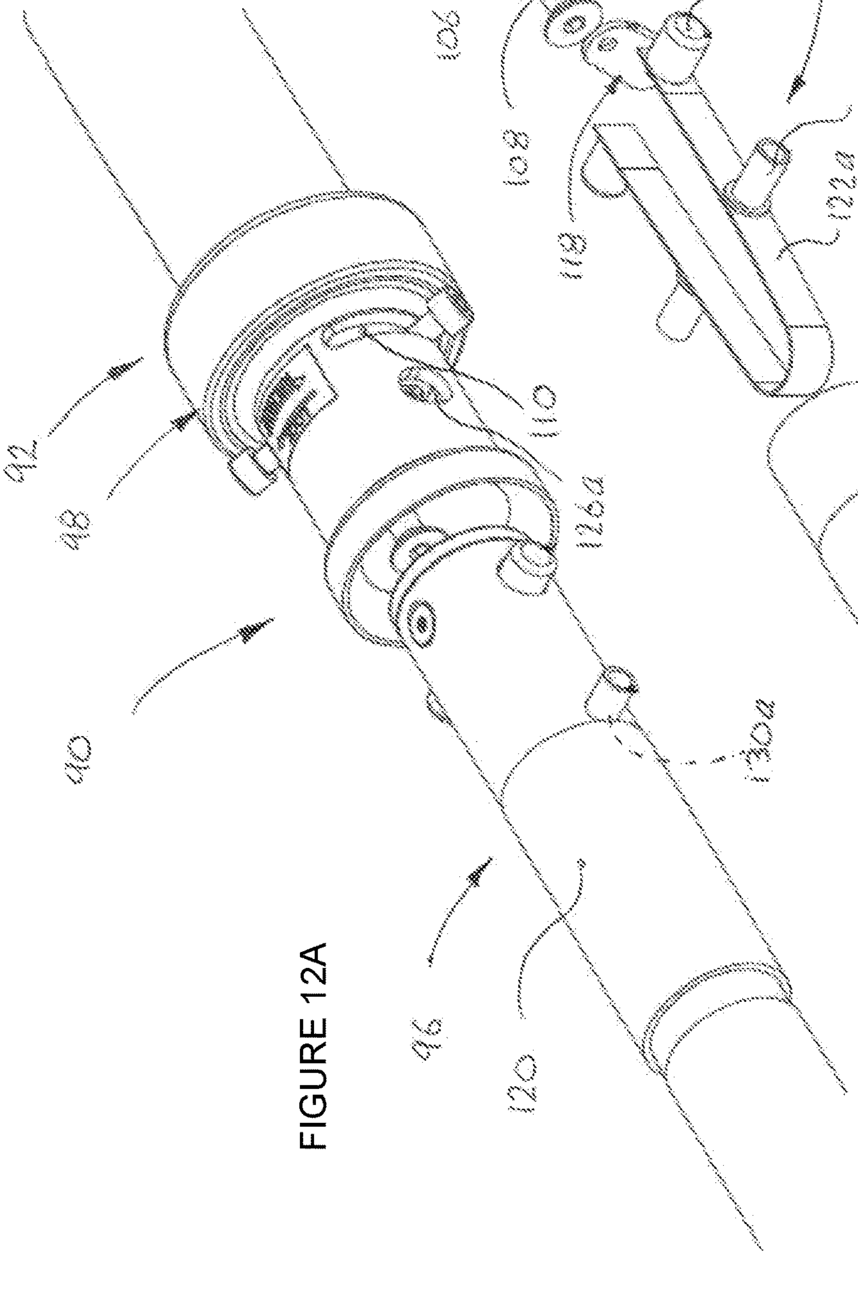
FIGS. 12A and 12B are perspective views of a gate catch assembly of one embodiment of a second aspect of the invention depicted in its open condition.
Figure 12B:
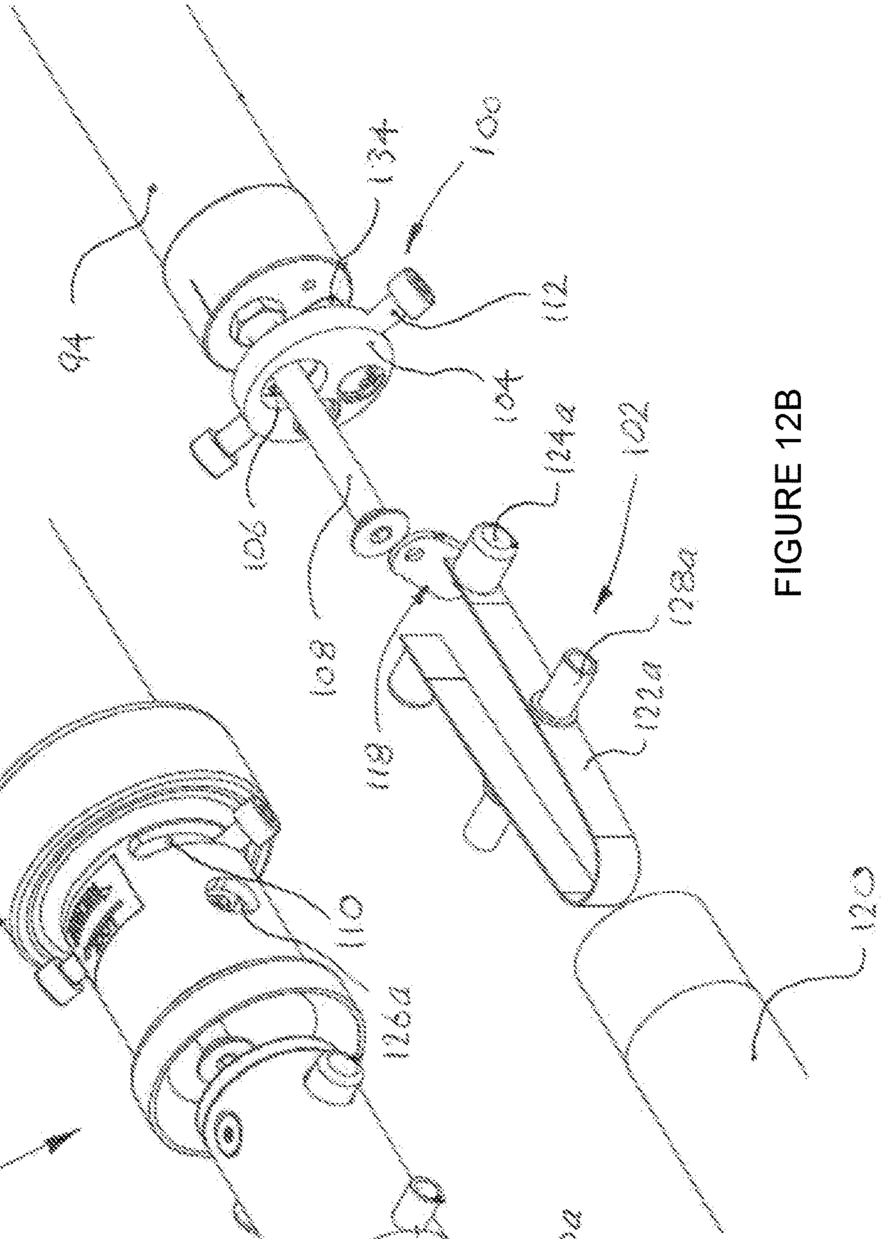
Figure 13A:
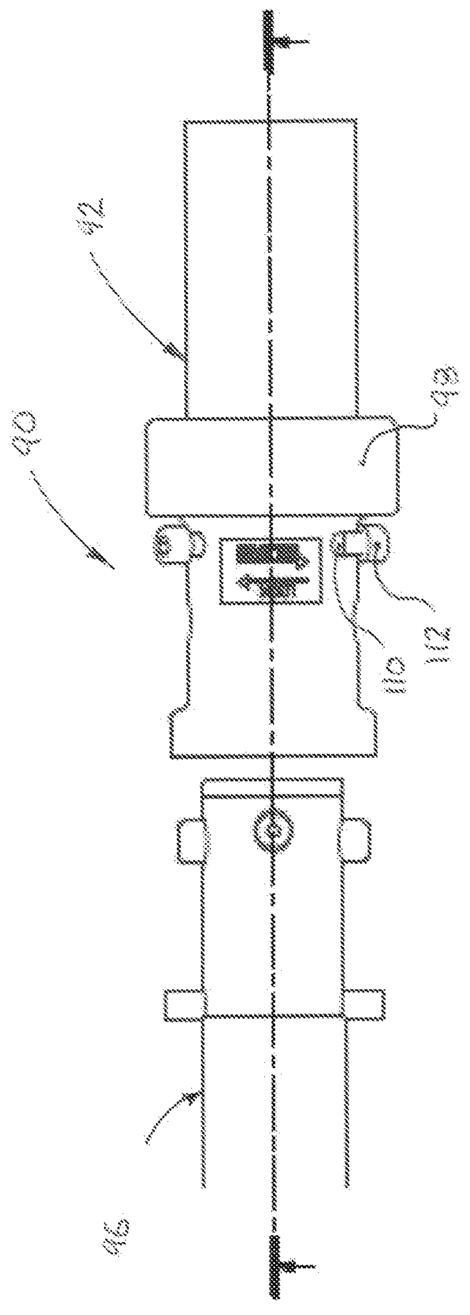
FIGS. 13A and 13B are elevation and sectional views of the gate catch assembly of FIG. 12.
Figure 13B:
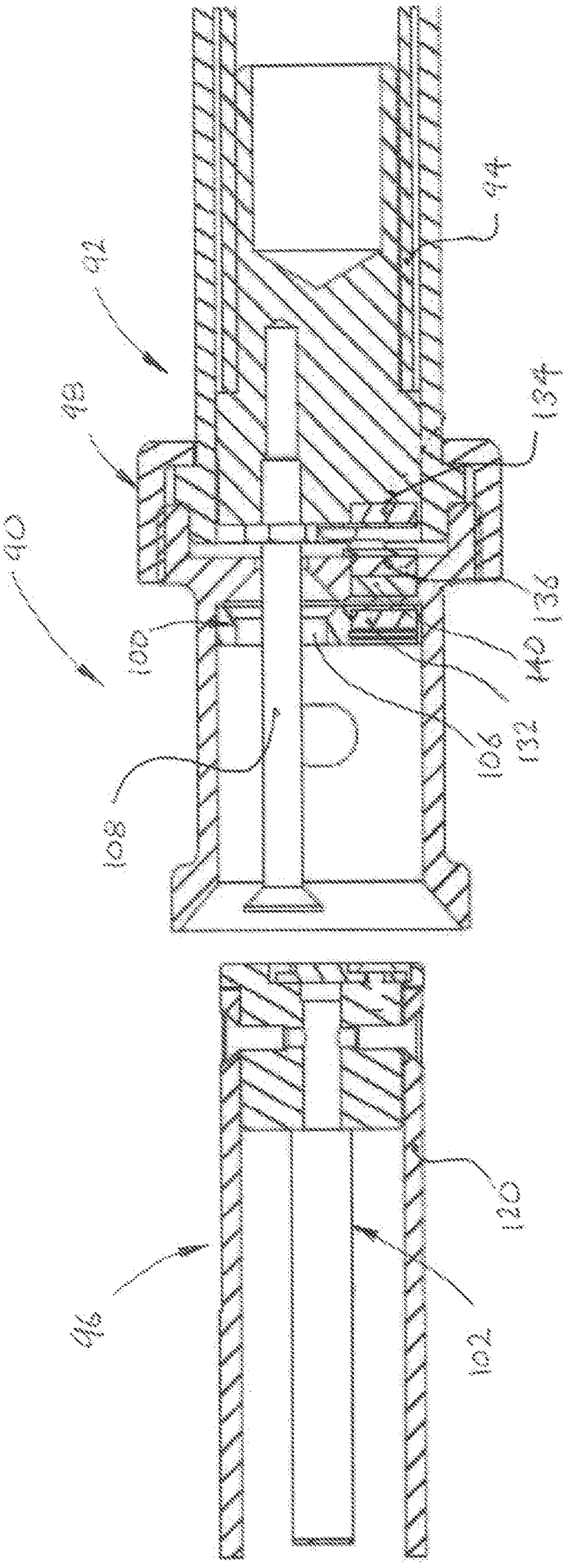
Figures 14A, 14B:
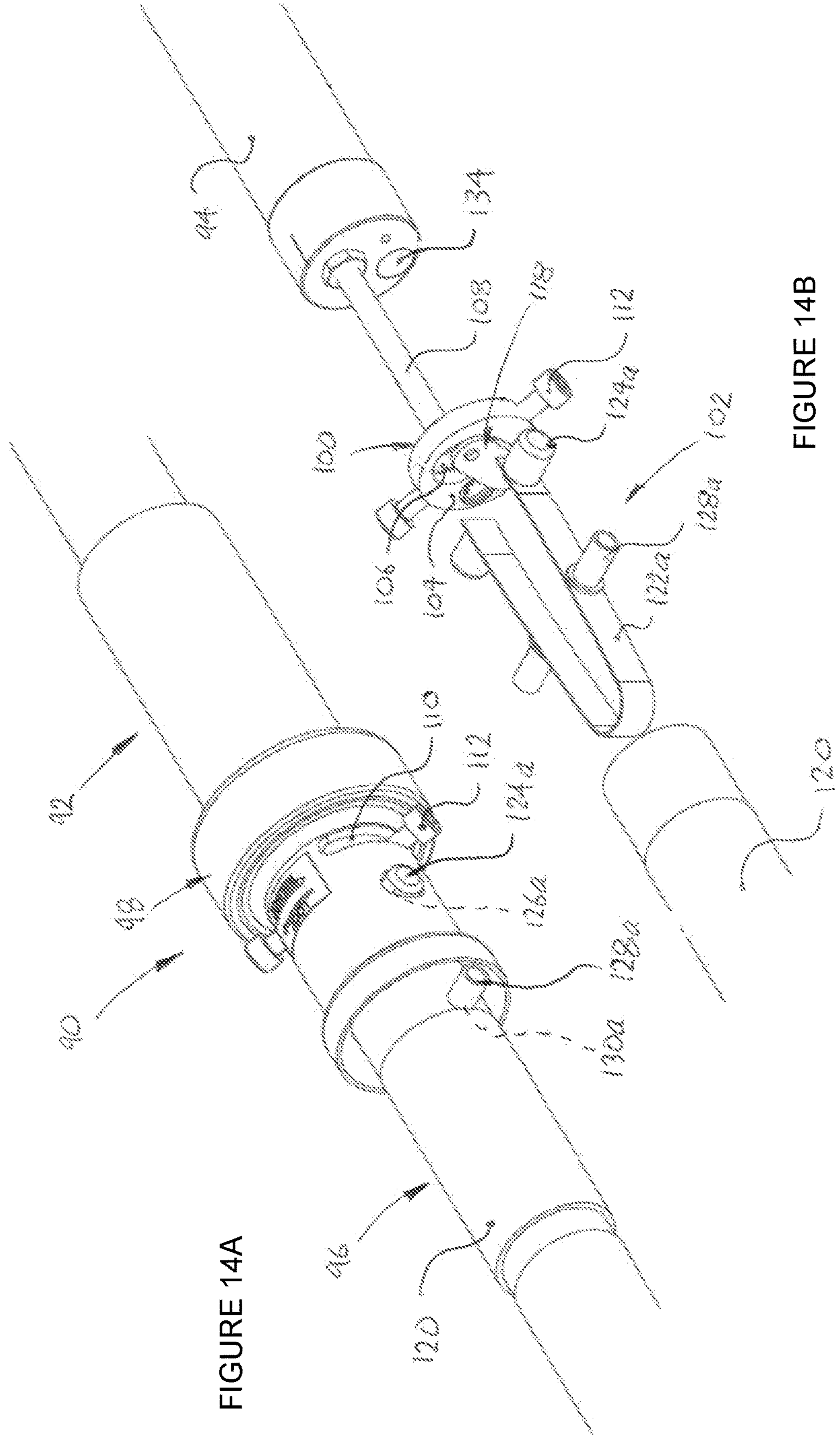
FIGS. 14A and 14B are perspective views of the gate catch assembly of the embodiments of FIGS. 12 and 13 shown in its closed condition, unlocked.
Figure 15A:
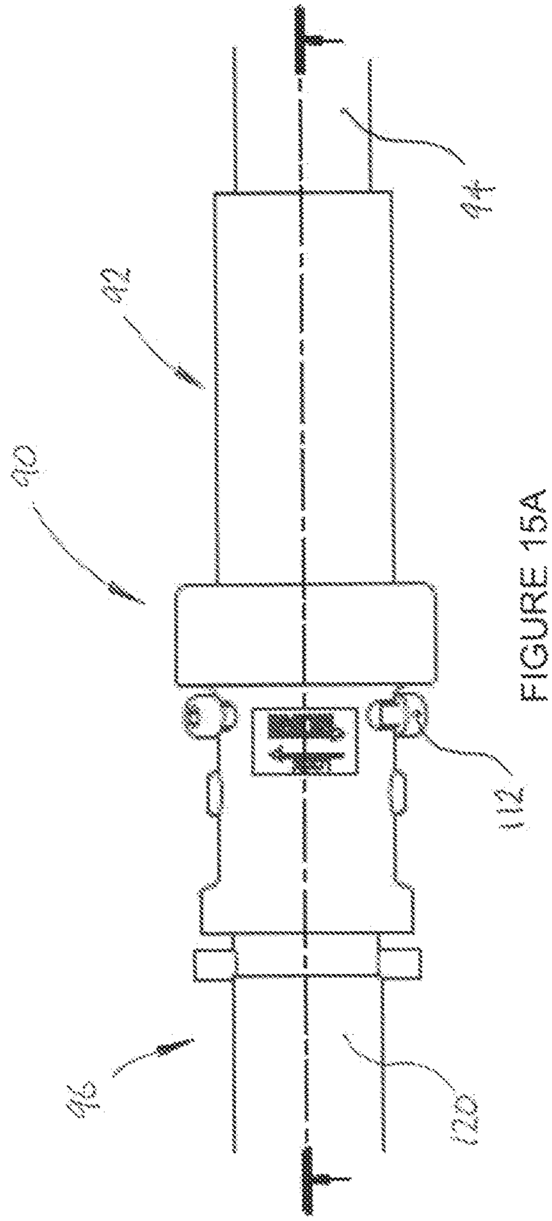
FIGS. 15A and 15B are elevation and sectional views of the gate catch assembly of FIG. 14.
Figure 15B:
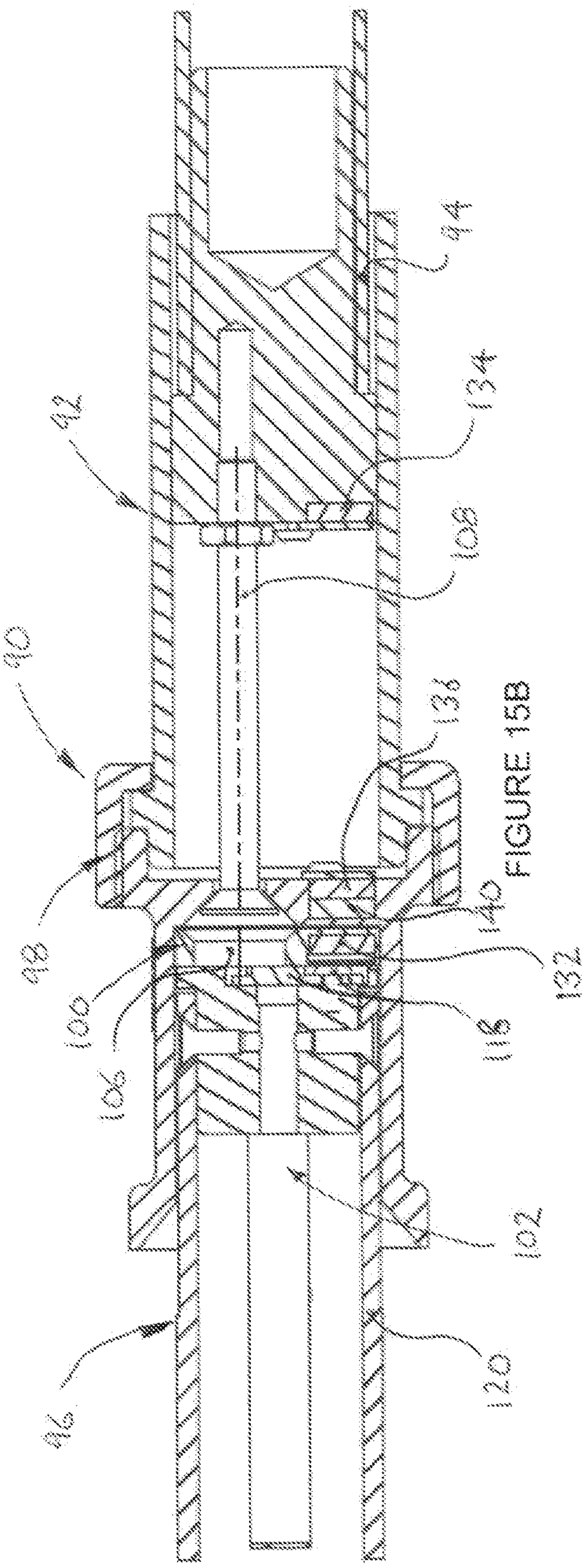
Figures 16A, 16B:
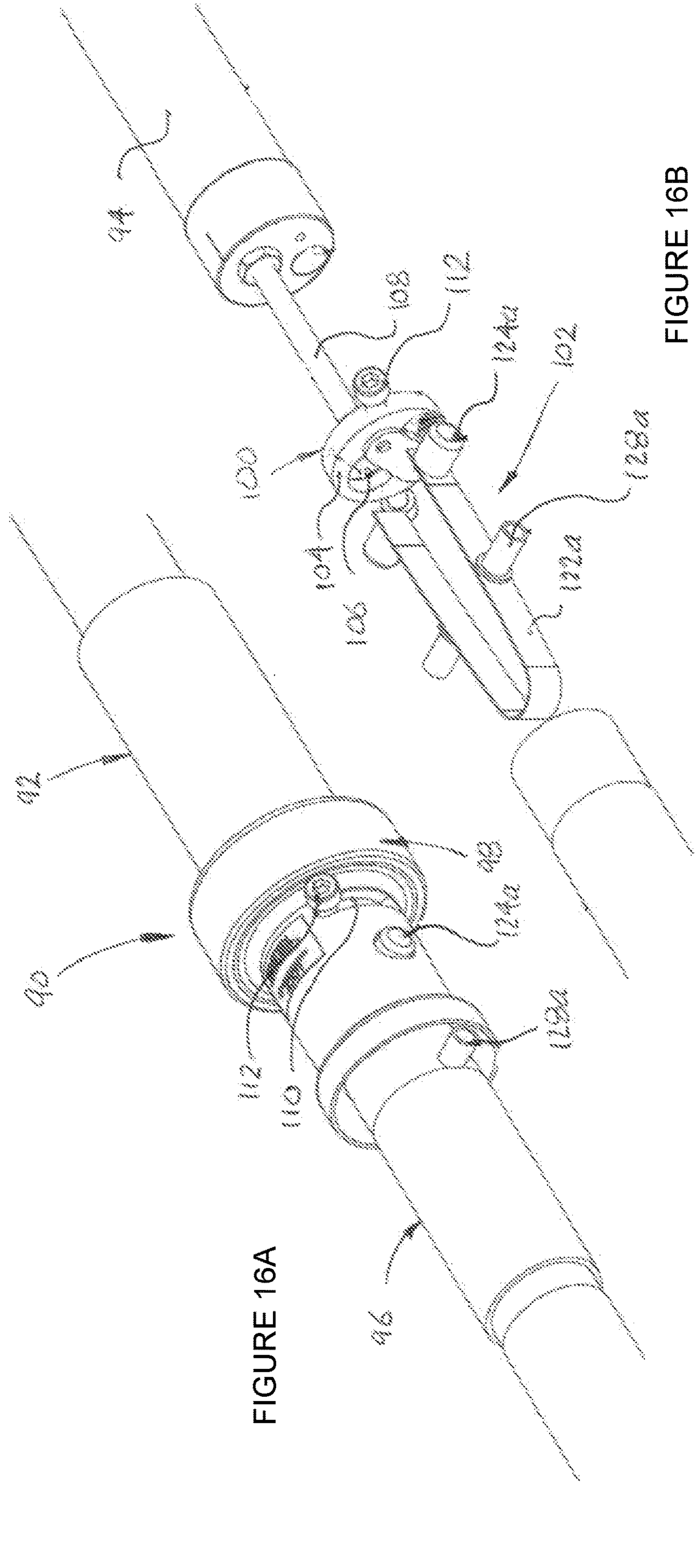
FIGS. 16A and 16B are perspective views of the gate catch assembly of the embodiments of FIGS. 14 and 15 shown in its closed condition locked.
Figure 17A:
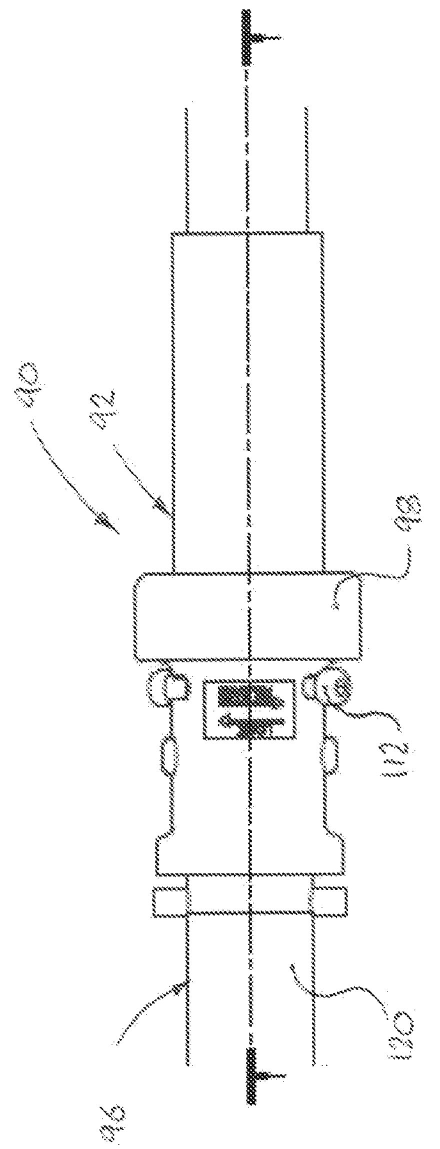
FIGS. 17A and 17B are elevation and sectional views of the gate catch assembly of FIG. 16.
Figure 17B:
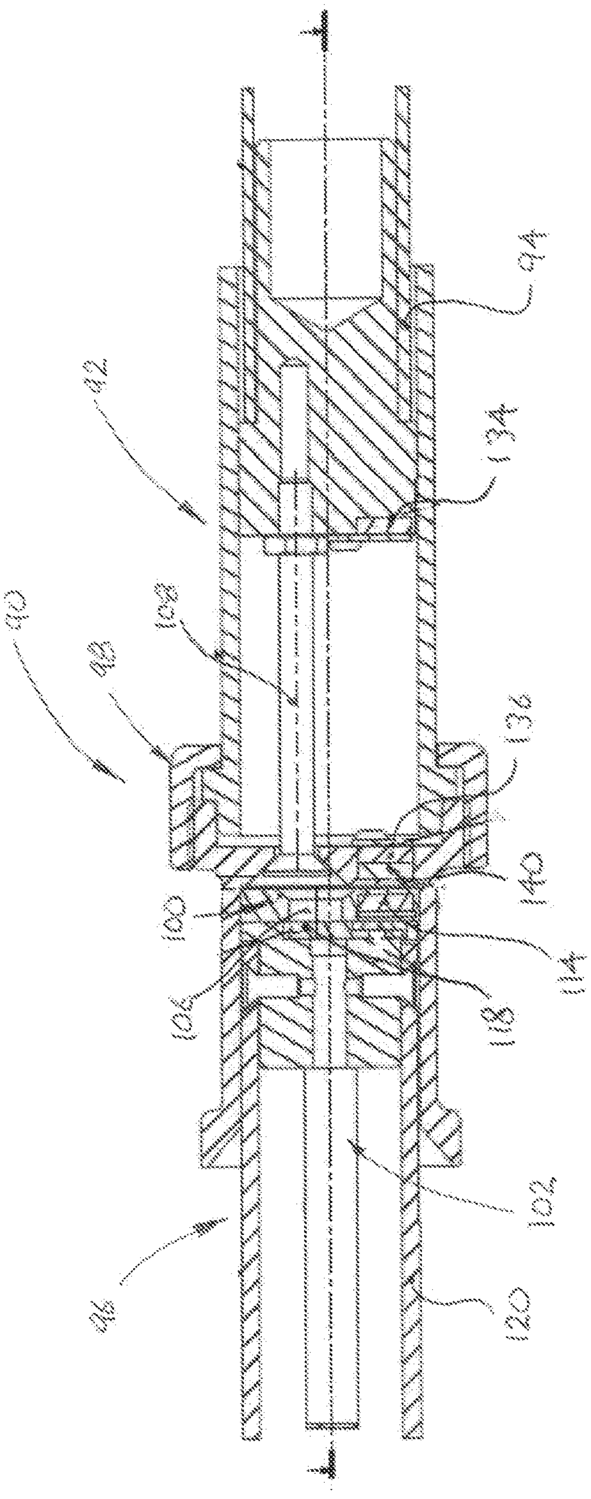
Figure 18:
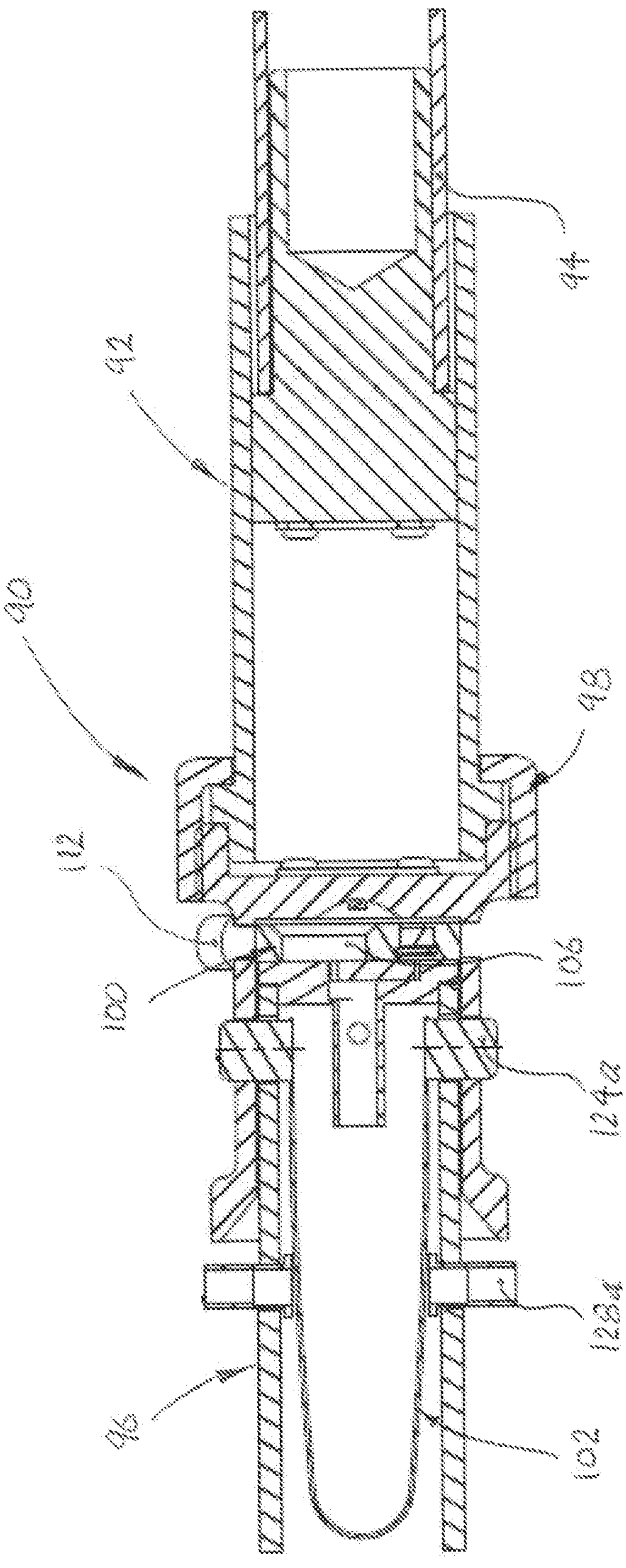
FIG. 18 shows another sectional view of the gate catch assembly of the embodiment of FIGS. 16 and 17.

FIGS. 12 and 13 show the outer sleeve 98 in the retracted position and the gate catch assembly 90 in its open condition whereas FIGS. 14 to 19 show the outer sleeve 98 in its extended position with the gate catch assembly in the closed condition. In FIGS. 14 and 15 the locking element 100 is in the unlocked position where it permits axial movement of the outer sleeve 98 from its extended position to the retracted position. In FIGS. 16 to 18 the locking element 100 is in the locked position which limits axial movement of the outer sleeve 98 from the illustrated extended position to a retracted position. In this embodiment the catch sub-assembly 96 includes an engagement arrangement 102 designed to be engaged by the outer sleeve 98 of the coupling sub-assembly 92 in its extended position.

The locking element 100 of this embodiment is rotationally mounted within the outer sleeve 98 for rotational movement between the locked and unlocked positions. The locking element 100 includes a locking disc 104 having a locking aperture 106 configured to cooperate with a locking bolt 108 associated with the gate member 94. The locking aperture 106 cooperates with the locking bolt 108 to either:

1. permit passage of the locking bolt 108 during axial movement of the outer sleeve 98 toward the retracted position with the locking element 100 rotated into the unlocked position (see FIGS. 12 to 15);
2. misalign with the locking bolt 108 to prevent its passage on axial movement of the outer sleeve 98 from the extended position with the locking element rotated into the locked position (see FIGS. 16 and 17).

In this embodiment the locking bolt 108 is mounted eccentric of an axis of the gate member 94. The locking aperture 106 of the locking element 100 is likewise positioned eccentric of an axis of the locking disc 104 wherein alignment of the locking bolt 108 with the locking aperture 106 is achieved with the locking element 100 in the unlocked position. In this example the outer sleeve 98 includes a circumferential keyway or slot 110 configured to be engaged by a corresponding key or rod 112 extending radially from the locking disc 104. The circumferential slot 110 and radial rod 112 are one of a pair of opposing slots/rods arranged to permit rotational movement of the locking disc 104 within the outer sleeve 98 whilst limiting axial displacement of the locking disc 104 relative to the outer sleeve 98.

Figure 19B:
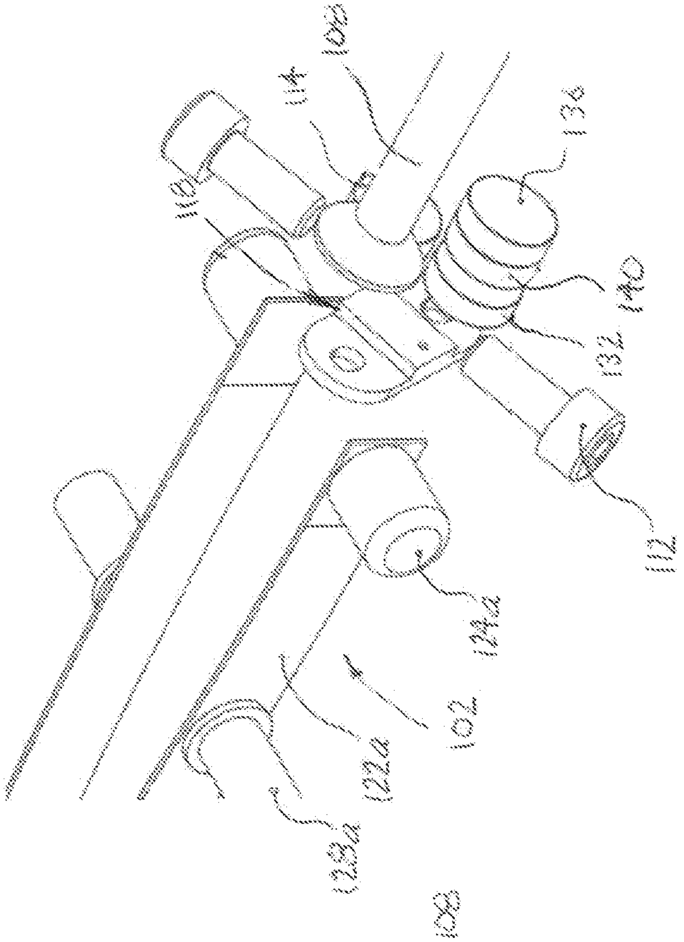
FIGS. 19A and 19B are perspective views of components of the gate catch assembly of FIGS. 14 to 18 with the associated locking element in locked and unlocked positions, respectively.
Figure 19A:
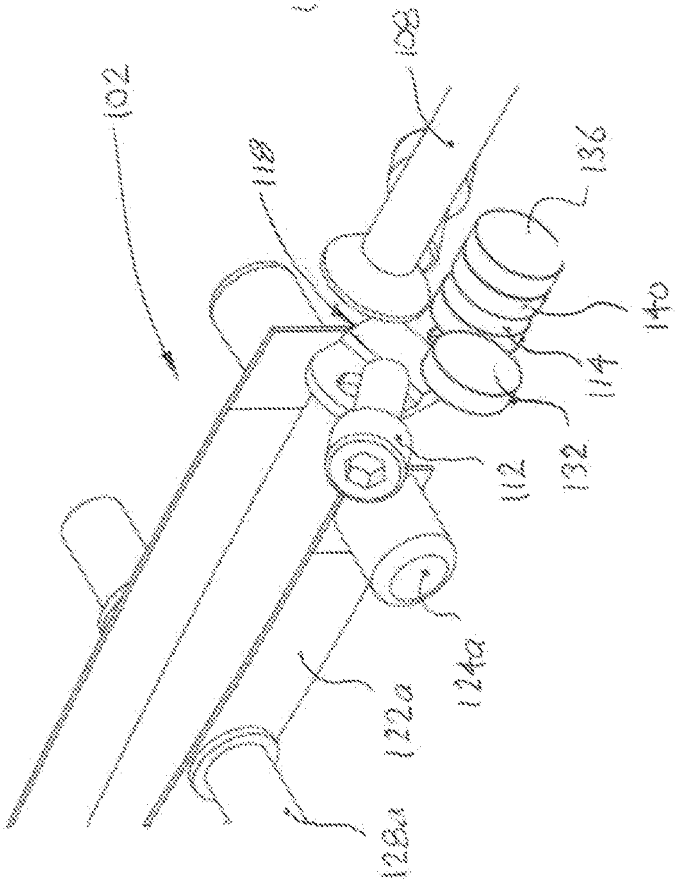

As best seen in FIG. 19A, the locking element 100 of this embodiment includes retaining means in the form of a first magnet 114 arranged in the locked position to align with a second magnet 140 within the outer sleeve 98 of the coupling sub-assembly 92 in its extended position. The first and second magnets 114 and 140 thus interact to retain the locking element 100 in the locked position. As best seen in FIG. 19B, the locking element 100 also includes a third magnet 132 arranged in the unlocked position to align with the first magnet 114 of the locking element 100 thereby retaining it in the unlocked position. The second magnet 132 located within the locking element 100 is angularly displaced relative to the first magnet 114 so that on rotation of the locking element 100 into the unlocked position the second magnet 132 aligns with the first magnet 114. In this example the catch sub-assembly 96 also includes a sensor 118 arranged to cooperate with the third magnet 132 of the locking element 100 to trigger the sensor 118 with the locking element 100 in the locked position (see FIG. 19A) The coupling sub-assembly 92 of this embodiment also includes a fourth magnet 134 mounted to the gate member 94 and arranged to cooperate with a fifth magnet 136 mounted within the outer sleeve 98 to maintain the outer sleeve 98 in its retracted position (see FIG. 13B).

Returning to FIGS. 14 and 15, the catch sub-assembly 96 is mounted to a catch member 120 within which the engagement arrangement 102 is mounted. The engagement arrangement 102 is in the form of tongs having a pair of opposing arms 122*a* and 122*b* each including a pair of outwardly extending engagement pins 124*a* and 124*b* respectively. The engagement pins **124*a/b* are designed for releasable engagement with corresponding apertures 126*a/b* in the outer sleeve 98 of the coupling sub-assembly 92 when the outer sleeve 98 is in the extended position. The engagement tongs 102 include actuator means in the form of a pair of release pins 128*a/b* also extending outwardly of the respective arms 122*a/b* and configured to extend radially through corresponding holes 130*a/b* in the catch member 120. The engagement tongs 102 are constructed of a resiliently flexible material and are biased within the catch member 120 to urge the engagement pins such as 124*a* radially outward of the catch member 120. It will be understood that disengagement of the engagement pins 124*a* from the corresponding apertures 126*a* in the outer sleeve 98 may be achieved by pressing the release pins 128*a* inward of the catch member 120**.

Now that a preferred embodiment of a railway track trolley and gate catch assembly have been described it will be apparent to those skilled in the art that they have the following advantages:

1. the demountable construction of the trolley lends itself to easy transportation and deployment at site;
2. the trolley and in particular the collapsible chassis is suitable for application on railway tracks of different gauges;
3. the trolley is relatively lightweight and of a demountable construction wherein each of its "components" can be lifted or otherwise moved manually without requiring lifting equipment;
4. the railway track trolley can be deployed relatively quickly without requiring tooling;
5. the railway track trolley includes a driven wheel assembly and associated controls which are efficient and safe in operation;
6. the gate catch assembly includes a locking element which without deliberate release ensures the gate catch assembly remains closed;
7. the gate catch assembly when associated with handrails and associated stanchions is effective in providing an axially rigid "joint" which ties the associated stanchions together via the interconnected handrails;
8. the gate catch assembly may include features which under most operational conditions, in a fail-safe manner, promote retention of the locking element in its locked position ensuring the catch assembly does not inadvertently open.

Those skilled in the art will appreciate that the invention as described herein is susceptible to variations and modifications other than those specifically described.

For example, in relation to the railway track trolley, the collapsible chassis need not be of a scissor configuration provided it can be expanded to the required separation matching the track gauge. The platform assembly may vary where for example the deck may be foldable for ease of transportation. The wheel configuration may be different where the driven wheels also effect braking of the trolley in which case the braked wheels are effectively idler wheels. The railway track trolley may depart from the inspection trolley of the preferred embodiment and take the form of an emergency response vehicle or an equipment trolley.

For example, in relation to the gate catch assembly, the gate catch assembly may have application in other mobile railway maintenance equipment including but not limited to machinery requiring secure access to a safe area such as a basket associated with an elevated work platform (EWP). The locking element may depart from the rotating disc of the preferred embodiment provided it is operatively coupled to the outer sleeve and cooperates with the gate member to permit axial movement of the outer sleeve for its retraction with the locking element unlocked. Importantly, the locking element must function so that retraction of the outer sleeve is limited on movement of the locking element into the locked position. The specific arrangement or inclusion of magnets described in the preferred embodiment may vary and still remain within the broad scope of this aspect of the invention. The engagement arrangement of the catch sub-assembly may in its simplest form be the gate or other member which is received by the outer sleeve of the coupling sub-assembly in its extended position.

All such variations and modifications are to be considered within the scope of the present invention the nature of which is to be determined from the foregoing description.

The invention claimed is:

1. A railway track trolley comprising:

a collapsible chassis including a pair of opposing beam members interconnected by a pair of telescopic cross members arranged diagonal to one another and pivotally connected at opposing ends to respective of the pair of opposing beam members wherein one of the telescopic cross members is at opposing ends pivotally connected proximal opposite ends of the respective beam members, an other of the telescopic cross members at opposing ends being pivotally connected proximal opposite ends of the respective beam members;

a pair of wheels mounted to each of the pair of opposing beam members whereby the collapsible chassis in an expanded condition is adapted to locate each of the pair of wheels on respective of a pair of railway tracks arranged at one of a plurality of predetermined track gauges, the pair of telescopic cross members being manipulated in length dependent on said one of the plurality of predetermined track gauges to achieve the required lateral separation of the opposing beam members in the expanded condition of the collapsible chassis; and one of a plurality of platforms being selected depending on the required lateral separation of the opposing beam members in the expanded condition of the collapsible chassis, said selected platform being detachably mounted to the collapsible chassis wherein the trolley is of a demountable construction, wherein each of the platforms includes a deck arranged to engage the collapsible chassis to retain the collapsible chassis in the expanded condition.

2. A railway track trolley as claimed in claim 1 wherein the telescopic cross members permit movement of the collapsible chassis from a collapsed condition into the expanded condition with the telescopic cross members moving in a scissor action.

3. A railway track trolley as claimed in claim 1 wherein each of the pair of wheels are removably mounted to the respective pair of opposing beam members.

4. A railway track trolley as claimed in claim 3 wherein one of each of the pair of wheels is driven for rotation via an associated drive mechanism.

5. A railway track trolley as claimed in claim 4 wherein the inspection trolley is thus self-propelled.

6. A railway track trolley as claimed in claim 5 wherein said driven one of the pair of wheels is located proximal one end of the corresponding beam member, the other of the pair of wheels being a braked wheel located proximal an opposite end of said beam member.

7. A railway track trolley as claimed in claim 6 wherein the driven wheels are disposed opposite one another and operatively coupled to either first or second driver stations dedicated to travel of the trolley in opposing directions.

8. A railway track trolley as claimed in claim 7 wherein each of the driven wheels is associated with an activation switch configured to be operated by a driver located at the first or second driver station.

* * * * *